United States Patent
Walton et al.

(10) Patent No.: US 8,358,714 B2
(45) Date of Patent: Jan. 22, 2013

(54) CODING AND MODULATION FOR MULTIPLE DATA STREAMS IN A COMMUNICATION SYSTEM

(75) Inventors: Jay Rodney Walton, Carlisle, MA (US); Irina Medvedev, Somerville, MA (US)

(73) Assignee: Qualcomm Incorporated, San Diego, CA (US)

( * ) Notice: Subject to any disclaimer, the term of this patent is extended or adjusted under 35 U.S.C. 154(b) by 1603 days.

(21) Appl. No.: 11/190,106

(22) Filed: Jul. 25, 2005

(65) Prior Publication Data

US 2006/0285605 A1    Dec. 21, 2006

Related U.S. Application Data

(63) Continuation of application No. 60/691,461, filed on Jun. 16, 2005.

(51) Int. Cl.
*H04L 1/02* (2006.01)

(52) U.S. Cl. ........ 375/267; 375/260; 375/299; 375/340; 375/347; 455/101; 455/132; 455/296; 455/500; 455/562.1; 370/334

(58) Field of Classification Search ................. 375/267, 375/299, 347, 260; 455/101, 132, 296, 500; 455/562.1; 370/334
See application file for complete search history.

(56) References Cited

U.S. PATENT DOCUMENTS

| | | | |
|---|---|---|---|
| 4,736,371 A | 4/1988 | Tejima et al. |
| 4,750,198 A | 6/1988 | Harper |
| 4,797,879 A | 1/1989 | Habbab et al. |
| 5,241,544 A | 8/1993 | Jasper et al. |
| 5,295,159 A | 3/1994 | Kerpez |
| 5,404,355 A | 4/1995 | Raith |
| 5,471,647 A | 11/1995 | Gerlach et al. |
| 5,479,447 A | 12/1995 | Chow et al. |
| 5,493,712 A | 2/1996 | Ramesh et al. |
| 5,506,861 A | 4/1996 | Bottomley |
| 5,509,003 A | 4/1996 | Snijders et al. |

(Continued)

FOREIGN PATENT DOCUMENTS

| AU | 2002259221 | 11/2002 |
|---|---|---|
| CA | 2690247 | 10/2001 |

(Continued)

OTHER PUBLICATIONS

International Search Report—PCT/US06/23515—International Search Authority—US, Dec. 18, 2006.

(Continued)

*Primary Examiner* — Leon Flores
(74) *Attorney, Agent, or Firm* — Qualcomm Patent Group; Dmitry Milikovsky; James H. Yancey, Jr.

(57) ABSTRACT

Techniques for transmitting multiple data streams to a single receiver using a single code rate and different modulation schemes are described. Channel estimates are determined for the multiple data streams and used to select a single code rate and multiple modulation schemes for the multiple data streams. The system may support a set of code rates, and each code rate may be associated with a respective set of modulation schemes that may be used with that code rate. The single code rate for all data streams is selected from among the set of supported code rates, and the modulation scheme for each data stream is selected from among the set of modulation schemes associated with the single code rate. The multiple data streams are encoded in accordance with the single code rate. Each data stream is further modulated in accordance with the modulation scheme selected for that stream.

43 Claims, 5 Drawing Sheets

U.S. PATENT DOCUMENTS

| | | | |
|---|---|---|---|
| 5,606,729 A | 2/1997 | Damico et al. |
| 5,638,369 A | 6/1997 | Ayerst et al. |
| 5,677,909 A | 10/1997 | Heide |
| 5,729,542 A | 3/1998 | Dupont |
| 5,790,550 A | 8/1998 | Peeters et al. |
| 5,818,813 A | 10/1998 | Saito et al. |
| 5,822,374 A | 10/1998 | Levin |
| 5,832,387 A | 11/1998 | Bae et al. |
| 5,867,478 A | 2/1999 | Baum et al. |
| 5,867,539 A | 2/1999 | Koslov |
| 5,886,988 A | 3/1999 | Yun et al. |
| 5,959,965 A | 9/1999 | Ohkubo et al. |
| 5,973,638 A | 10/1999 | Robbins et al. |
| 5,982,327 A | 11/1999 | Vook et al. |
| 6,049,548 A | 4/2000 | Bruno et al. |
| 6,072,779 A | 6/2000 | Tzannes et al. |
| 6,084,915 A | 7/2000 | Williams |
| 6,097,771 A | 8/2000 | Foschini |
| 6,115,354 A | 9/2000 | Weck |
| 6,122,247 A | 9/2000 | Levin et al. |
| 6,131,016 A | 10/2000 | Greenstein et al. |
| 6,141,388 A | 10/2000 | Servais et al. |
| 6,141,542 A | 10/2000 | Kotzin et al. |
| 6,141,567 A | 10/2000 | Youssefmir et al. |
| 6,144,711 A | 11/2000 | Raleigh et al. |
| 6,163,296 A | 12/2000 | Lier et al. |
| 6,167,031 A | 12/2000 | Olofsson et al. |
| 6,178,196 B1 | 1/2001 | Naguib et al. |
| 6,205,410 B1 | 3/2001 | Cai |
| 6,222,888 B1 | 4/2001 | Kao et al. |
| 6,232,918 B1 | 5/2001 | Wax et al. |
| 6,266,528 B1 | 7/2001 | Farzaneh |
| 6,275,543 B1 | 8/2001 | Petrus et al. |
| 6,278,726 B1 | 8/2001 | Mesecher et al. |
| 6,292,917 B1 | 9/2001 | Sinha et al. |
| 6,298,035 B1 | 10/2001 | Heiskala |
| 6,298,092 B1 | 10/2001 | Heath, Jr. et al. |
| 6,308,080 B1 | 10/2001 | Burt et al. |
| 6,314,113 B1 | 11/2001 | Guemas |
| 6,314,289 B1 | 11/2001 | Eberlein et al. |
| 6,317,612 B1 | 11/2001 | Farsakh |
| 6,330,277 B1 | 12/2001 | Gelblum et al. |
| 6,330,293 B1 | 12/2001 | Klank et al. |
| 6,330,462 B1 | 12/2001 | Chen |
| 6,333,953 B1 | 12/2001 | Bottomley et al. |
| 6,339,399 B1 | 1/2002 | Andersson et al. |
| 6,345,036 B1 | 2/2002 | Sudo et al. |
| 6,346,910 B1 | 2/2002 | Ito |
| 6,351,499 B1 | 2/2002 | Paulraj et al. |
| 6,363,267 B1 | 3/2002 | Lindskog et al. |
| 6,369,758 B1 | 4/2002 | Zhang |
| 6,377,812 B1 | 4/2002 | Rashid-Farrokhi et al. |
| 6,385,264 B1 | 5/2002 | Terasawa et al. |
| 6,426,971 B1 | 7/2002 | Wu et al. |
| 6,452,981 B1 | 9/2002 | Raleigh et al. |
| 6,463,290 B1 | 10/2002 | Stilp et al. |
| 6,473,467 B1 | 10/2002 | Wallace et al. |
| 6,478,422 B1 | 11/2002 | Hansen |
| 6,492,942 B1 | 12/2002 | Kezys |
| 6,510,184 B1 | 1/2003 | Okamura |
| 6,515,617 B1 | 2/2003 | Demers et al. |
| 6,532,225 B1 | 3/2003 | Chang et al. |
| 6,532,255 B1 | 3/2003 | Gunzelmann et al. |
| 6,532,562 B1 | 3/2003 | Chou et al. |
| 6,545,997 B1 | 4/2003 | Bohnke et al. |
| 6,574,211 B2 | 6/2003 | Padovani et al. |
| 6,574,267 B1 | 6/2003 | Kanterakis et al. |
| 6,574,271 B2 | 6/2003 | Mesecher et al. |
| 6,594,473 B1 | 7/2003 | Dabak et al. |
| 6,594,798 B1 | 7/2003 | Chou et al. |
| 6,597,682 B1 | 7/2003 | Kari |
| 6,608,874 B1 | 8/2003 | Beidas et al. |
| 6,611,231 B2 | 8/2003 | Crilly, Jr. et al. |
| 6,615,024 B1 | 9/2003 | Boros et al. |
| 6,631,121 B1 | 10/2003 | Yoon |
| 6,636,496 B1 | 10/2003 | Cho et al. |
| 6,636,568 B2 | 10/2003 | Kadous |
| 6,654,590 B2 | 11/2003 | Boros et al. |
| 6,654,613 B1 | 11/2003 | Maeng et al. |
| 6,668,161 B2 | 12/2003 | Boros et al. |
| 6,683,916 B1 | 1/2004 | Sartori et al. |
| 6,690,660 B2 | 2/2004 | Kim et al. |
| 6,693,992 B2 | 2/2004 | Jones et al. |
| 6,697,346 B1 | 2/2004 | Halton et al. |
| 6,711,121 B1 * | 3/2004 | Gerakoulis et al. ........... 370/205 |
| 6,728,233 B1 | 4/2004 | Park et al. |
| 6,731,668 B2 | 5/2004 | Ketchum |
| 6,735,188 B1 | 5/2004 | Becker et al. |
| 6,738,020 B1 | 5/2004 | Lindskog et al. |
| 6,744,811 B1 | 6/2004 | Kantschuk |
| 6,751,444 B1 | 6/2004 | Meiyappan |
| 6,751,480 B2 | 6/2004 | Kogiantis et al. |
| 6,757,263 B1 | 6/2004 | Olds |
| 6,760,313 B1 | 7/2004 | Sindhushayana et al. |
| 6,760,388 B2 | 7/2004 | Ketchum et al. |
| 6,760,882 B1 | 7/2004 | Gesbert et al. |
| 6,768,727 B1 | 7/2004 | Sourour et al. |
| 6,771,706 B2 | 8/2004 | Ling et al. |
| 6,785,341 B2 | 8/2004 | Walton et al. |
| 6,785,513 B1 | 8/2004 | Sivaprakasam |
| 6,788,948 B2 | 9/2004 | Lindskog et al. |
| 6,792,041 B1 | 9/2004 | Kim et al. |
| 6,795,424 B1 | 9/2004 | Kapoor et al. |
| 6,798,738 B1 | 9/2004 | Do et al. |
| 6,801,790 B2 | 10/2004 | Rudrapatna |
| 6,802,035 B2 | 10/2004 | Catreux et al. |
| 6,804,191 B2 | 10/2004 | Richardson |
| 6,821,535 B2 | 11/2004 | Nurmi et al. |
| 6,847,828 B2 | 1/2005 | Miyoshi et al. |
| 6,850,252 B1 | 2/2005 | Hoffberg |
| 6,850,498 B2 | 2/2005 | Heath et al. |
| 6,859,503 B2 | 2/2005 | Pautler et al. |
| 6,862,271 B2 | 3/2005 | Medvedev et al. |
| 6,862,440 B2 | 3/2005 | Sampath |
| 6,868,079 B1 | 3/2005 | Hunt |
| 6,873,651 B2 | 3/2005 | Tesfai et al. |
| 6,879,578 B2 | 4/2005 | Pan et al. |
| 6,879,579 B1 | 4/2005 | Myles et al. |
| 6,885,708 B2 | 4/2005 | Thomas et al. |
| 6,888,809 B1 | 5/2005 | Foschini et al. |
| 6,888,899 B2 | 5/2005 | Raleigh et al. |
| 6,891,858 B1 | 5/2005 | Mahesh et al. |
| 6,920,192 B1 | 7/2005 | Laroia et al. |
| 6,920,194 B2 | 7/2005 | Stopler et al. |
| 6,927,728 B2 | 8/2005 | Vook et al. |
| 6,937,592 B1 | 8/2005 | Heath, Jr. et al. |
| 6,940,917 B2 | 9/2005 | Menon et al. |
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 | 10/2005 | Fukuda |
| 6,956,906 B2 | 10/2005 | Tager et al. |
| 6,959,171 B2 | 10/2005 | Tsien et al. |
| 6,963,742 B2 | 11/2005 | Boros et al. |
| 6,965,762 B2 | 11/2005 | Sugar et al. |
| 6,980,601 B2 | 12/2005 | Jones |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,031,671 B2 | 4/2006 | Mottier |
| 7,035,359 B2 | 4/2006 | Molnar |
| 7,039,125 B2 | 5/2006 | Friedman |
| 7,058,367 B1 | 6/2006 | Luo et al. |
| 7,062,294 B1 | 6/2006 | Rogard et al. |

| Patent No. | Date | Inventor(s) |
|---|---|---|
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,088,671 B1 | 8/2006 | Monsen |
| 7,095,709 B2 | 8/2006 | Walton et al. |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano |
| 7,120,199 B2 | 10/2006 | Thielecke et al. |
| 7,127,009 B2 * | 10/2006 | Berthet et al. ............... 375/341 |
| 7,130,362 B2 * | 10/2006 | Girardeau et al. ............ 375/340 |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,149,254 B2 | 12/2006 | Sampath |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,669 B2 | 1/2007 | Li et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani (Nissensohn) |
| 7,260,366 B2 | 8/2007 | Lee et al. |
| 7,263,119 B1 | 8/2007 | Hsu et al. |
| 7,274,734 B2 | 9/2007 | Tsatsanis |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 * | 4/2008 | Yano et al. .................... 370/334 |
| 7,356,089 B2 | 4/2008 | Jia et al. |
| 7,379,492 B2 * | 5/2008 | Hwang ........................ 375/219 |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 * | 10/2009 | Ionescu et al. ................ 375/267 |
| 7,603,141 B2 | 10/2009 | Dravida |
| 7,606,296 B1 | 10/2009 | Hsu et al. |
| 7,606,319 B2 * | 10/2009 | Zhang et al. .................. 375/267 |
| 7,623,871 B2 | 11/2009 | Sheynblat |
| 7,636,573 B2 | 12/2009 | Walton et al. |
| 7,653,142 B2 | 1/2010 | Ketchum et al. |
| 7,653,415 B2 | 1/2010 | Van Rooyen |

| Pub. No. | Date | Inventor(s) |
|---|---|---|
| 2001/0017881 A1 | 8/2001 | Bhatoolaul et al. |
| 2001/0031621 A1 | 10/2001 | Schmutz |
| 2001/0046205 A1 | 11/2001 | Easton et al. |
| 2002/0003774 A1 | 1/2002 | Wang et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0041632 A1 | 4/2002 | Sato et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0075830 A1 | 6/2002 | Hartman, Jr. |
| 2002/0085620 A1 | 7/2002 | Mesecher |
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0154705 A1 | 10/2002 | Walton et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0003863 A1 | 1/2003 | Thielecke et al. |
| 2003/0003880 A1 | 1/2003 | Ling et al. |
| 2003/0012308 A1 | 1/2003 | Sampath et al. |
| 2003/0039317 A1 | 2/2003 | Taylor et al. |
| 2003/0043732 A1 | 3/2003 | Walton et al. |
| 2003/0045288 A1 | 3/2003 | Luschi et al. |
| 2003/0048856 A1 | 3/2003 | Ketchum et al. |
| 2003/0076812 A1 | 4/2003 | Benedittis |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0112745 A1 | 6/2003 | Zhuang et al. |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0153360 A1 | 8/2003 | Burke et al. |
| 2003/0157954 A1 | 8/2003 | Medvedev et al. |
| 2003/0162519 A1 | 8/2003 | Smith et al. |
| 2003/0185309 A1 | 10/2003 | Pautler et al. |
| 2003/0185311 A1 | 10/2003 | Kim |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235149 A1 | 12/2003 | Chan et al. |
| 2003/0235255 A1 | 12/2003 | Ketchum et al. |
| 2003/0236080 A1 | 12/2003 | Kadous et al. |
| 2004/0005887 A1 | 1/2004 | Bahrenburg et al. |
| 2004/0037257 A1 | 2/2004 | Ngo |
| 2004/0042556 A1 | 3/2004 | Medvedev et al. |
| 2004/0052228 A1 | 3/2004 | Tellado et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0082356 A1 | 4/2004 | Walton et al. |
| 2004/0085939 A1 | 5/2004 | Wallace et al. |
| 2004/0120411 A1 | 6/2004 | Walton et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton et al. |
| 2004/0160987 A1 | 8/2004 | Sudo et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0252632 A1 | 12/2004 | Bourdoux et al. |
| 2005/0047384 A1 | 3/2005 | Wax et al. |
| 2005/0047515 A1 | 3/2005 | Walton et al. |
| 2005/0088959 A1 | 4/2005 | Kadous |

| | | | |
|---|---|---|---|
| 2005/0099974 A1 | 5/2005 | Kats et al. | |
| 2005/0120097 A1 | 6/2005 | Walton et al. | |
| 2005/0128953 A1 | 6/2005 | Wallace et al. | |
| 2005/0135284 A1 | 6/2005 | Nanda et al. | |
| 2005/0135295 A1 | 6/2005 | Walton et al. | |
| 2005/0135318 A1 | 6/2005 | Walton et al. | |
| 2005/0147177 A1* | 7/2005 | Seo et al. | 375/267 |
| 2005/0185575 A1* | 8/2005 | Hansen et al. | 370/208 |
| 2005/0208959 A1 | 9/2005 | Chen et al. | |
| 2005/0220211 A1* | 10/2005 | Shim et al. | 375/267 |
| 2005/0276343 A1 | 12/2005 | Jones | |
| 2006/0018247 A1* | 1/2006 | Driesen et al. | 370/208 |
| 2006/0018395 A1 | 1/2006 | Tzannes | |
| 2006/0067417 A1 | 3/2006 | Park et al. | |
| 2006/0072649 A1 | 4/2006 | Chang et al. | |
| 2006/0077935 A1 | 4/2006 | Hamalainen et al. | |
| 2006/0104196 A1 | 5/2006 | Wu et al. | |
| 2006/0104340 A1 | 5/2006 | Walton et al. | |
| 2006/0153237 A1 | 7/2006 | Hwang et al. | |
| 2006/0159120 A1 | 7/2006 | KIm | |
| 2006/0183497 A1 | 8/2006 | Paranchych et al. | |
| 2006/0209894 A1 | 9/2006 | Tzannes et al. | |
| 2006/0209937 A1 | 9/2006 | Tanaka et al. | |
| 2007/0177681 A1 | 8/2007 | Choi et al. | |
| 2007/0274278 A1 | 11/2007 | Choi et al. | |
| 2008/0069015 A1 | 3/2008 | Walton et al. | |
| 2008/0267098 A1 | 10/2008 | Walton et al. | |
| 2008/0267138 A1 | 10/2008 | Walton et al. | |
| 2008/0285488 A1 | 11/2008 | Walton et al. | |
| 2008/0285669 A1 | 11/2008 | Walton et al. | |
| 2008/0285670 A1 | 11/2008 | Walton et al. | |
| 2010/0067401 A1 | 3/2010 | Medvedev et al. | |
| 2010/0119001 A1 | 5/2010 | Walton et al. | |
| 2010/0142636 A1 | 6/2010 | Heath, Jr. et al. | |
| 2010/0183088 A1 | 7/2010 | Inanoglu | |
| 2010/0260060 A1 | 10/2010 | Abraham et al. | |

FOREIGN PATENT DOCUMENTS

| | | |
|---|---|---|
| CN | 1086061 | 4/1994 |
| CN | 1234661 | 11/1999 |
| CN | 1308794 | 8/2001 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1 416 688 A1 | 5/2004 |
| EP | 1 447 934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 2991167 | 12/1999 |
| JP | 2000078105 | 3/2000 |
| JP | 2000092009 A | 3/2000 |
| JP | 2001044930 A | 2/2001 |
| JP | 200186045 | 3/2001 |
| JP | 2001186051 A | 7/2001 |
| JP | 2001217896 | 8/2001 |
| JP | 2001231074 | 8/2001 |
| JP | 2001237751 | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504372 | 2/2006 |
| KR | 200011799 | 2/2000 |
| KR | 20010098861 | 11/2001 |
| KR | 1020020003370 | 1/2002 |
| KR | 20030085040 | 11/2003 |
| KR | 20060095576 A | 8/2006 |
| RU | 2015281 C1 | 6/1994 |
| RU | 2139633 | 10/1999 |
| RU | 2141168 | 11/1999 |
| RU | 2146418 C1 | 3/2000 |
| RU | 2149509 | 5/2000 |
| RU | 2152132 | 6/2000 |
| RU | 2157592 | 10/2000 |
| RU | 2158479 C2 | 10/2000 |
| RU | 2168278 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 545006 B | 8/2003 |
| TW | 583842 B | 4/2004 |
| TW | I230525 | 4/2005 |
| WO | WO8607223 | 12/1986 |
| WO | WO9307684 A1 | 4/1993 |
| WO | WO9507578 A1 | 3/1995 |
| WO | WO9530316 A1 | 11/1995 |
| WO | WO9532567 A1 | 11/1995 |
| WO | WO9622662 | 7/1996 |
| WO | WO9635268 | 11/1996 |

| | | |
|---|---|---|
| WO | WO9719525 A1 | 5/1997 |
| WO | WO9736377 A1 | 10/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 A1 | 7/1998 |
| WO | WO9857472 | 12/1998 |
| WO | WO9903224 | 1/1999 |
| WO | WO9914878 | 3/1999 |
| WO | WO9916214 | 4/1999 |
| WO | WO9944379 A1 | 9/1999 |
| WO | WO9957820 | 11/1999 |
| WO | WO0011823 A1 | 3/2000 |
| WO | WO0036764 A2 | 6/2000 |
| WO | WO0062456 | 10/2000 |
| WO | WO0105067 A1 | 1/2001 |
| WO | WO0126269 | 4/2001 |
| WO | WO0169801 | 9/2001 |
| WO | WO0171928 | 9/2001 |
| WO | WO0176110 A2 | 10/2001 |
| WO | WO0180510 A1 | 10/2001 |
| WO | WO0182521 A2 | 11/2001 |
| WO | WO0197400 | 12/2001 |
| WO | WO0201732 A2 | 1/2002 |
| WO | WO0203557 A1 | 1/2002 |
| WO | WO0215433 A1 | 2/2002 |
| WO | WO0225853 A2 | 3/2002 |
| WO | WO02060138 | 8/2002 |
| WO | WO02062002 A1 | 8/2002 |
| WO | WO02065664 | 8/2002 |
| WO | WO02069523 A1 | 9/2002 |
| WO | WO02069590 A1 | 9/2002 |
| WO | WO02073869 A1 | 9/2002 |
| WO | WO02078211 A2 | 10/2002 |
| WO | WO02082689 A2 | 10/2002 |
| WO | WO02088656 | 11/2002 |
| WO | WO02093784 A1 | 11/2002 |
| WO | WO02099992 | 12/2002 |
| WO | WO03010984 A1 | 2/2003 |
| WO | WO03010994 A1 | 2/2003 |
| WO | WO03019984 A1 | 3/2003 |
| WO | WO03028153 | 4/2003 |
| WO | WO03034646 A2 | 4/2003 |
| WO | WO03047140 A1 | 6/2003 |
| WO | WO03075479 | 9/2003 |
| WO | WO2004002011 | 12/2003 |
| WO | WO2004002047 | 12/2003 |
| WO | WO2004038985 A2 | 5/2004 |
| WO | WO2004038986 | 5/2004 |
| WO | WO2004039011 | 5/2004 |
| WO | WO2004039022 | 5/2004 |
| WO | WO2005041515 | 5/2005 |
| WO | WO2005043855 | 5/2005 |
| WO | WO2005046113 A2 | 5/2005 |

OTHER PUBLICATIONS

Written Opinion—PCT/US06/06/23515—International Search Authority—US, Dec. 18, 2006.
International Preliminary Report on Patentability-PCT/US06/023515-The International Bureau of WIPO- Geneva, Switzerland, Dec. 17, 2007.
Grunheid et al., "Adaptive Modulation and Multiple Access for the OFDM Transmission Technique", Wireless Personal Communications 13: May 13, 2000, 2000 Kluwer Academic Publishers, pp. 4-13.
European Search Report—EP11173875—Search Authority—Hague—Oct. 25, 2011.
G. Bauch, J. Hagenauer, "Smart Versus Dumb Antennas—Capacities and FEC Performance," IEEE Communications Letters, vol. 6, No. 2, pp. 55-57, Feb. 2002.
Partial European Search Report—EP10012069—Search Authority—The Hague—Nov. 29, 2011.
Supplementary European Search Report—EP06759443—Search Authority—Hague—Nov. 24, 2011.
Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0/7803-4320-7.
3GPP2 TIA/EIA/IS-2000.2-A, "Physical Layer Standard for cdma2000: Standards for Spread Spectrum Systems," (Mar. 2000), Telecommunications Industry Association, pp. 1-446.
Alamouti, S.M., "A Simple Transmit Diversity Technique for Wireless Communications," IEEE Journal on Select Areas in Communications, vol. 16, No. 8, Oct. 1998, pp. 1451-1458.
Bingham, John A.C.: "Multicarrier Modulation for Data Transmission: An Idea Whose Time Has Come," IEEE Communications Magazine, pp. 5-14 (May 1990).
Bong-Gee Song et al., "Prefilter design using the singular value decomposition for MIMO equalization" Signals, Systems and Computers, vol. 1, Nov. 3-6, 1996, pp. 34-38, XP010231388, IEEE, US DOI : 10.1109/ACSSC. 1996.600812 ISBN: 978-0-8186-7646-8, p. 35, col. 2, paragraph 4-p. 36, col. 1.
Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001, pp. 1-5.
Co-pending U.S. Appl. No. 60/421,309, filed Oct. 25, 2002.
Co-pending U.S. Appl. No. 60/421,428, filed Oct. 25, 2002.
Deneire, Luc, et al.: "A Low Complexity ML Channel Estimator for OFDM," Proc IEEE ICC (Jun. 2001), pp. 1461-1465.
Diggavi, S. et al., "Intercarrier interference in MIMO OFDM," IEEE International Conference on Communications, (Aug. 2002), vol. 1, pp. 485-489, doi: 10.1109/ICC.2002.996901.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
Fuji!, M.: "Pseudo-Orthogonal Multibeam-Time Transmit Diversity for OFDM-CDMA" pp. 222-226 (2002).
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Hassibi, B. et al., "High Rate Codes That Are Linear in Space and Time," Lucent Technologies, 2002, pp. 1-55.
Haustein, T. et al.: "Performance of MIMO Systems with Channel Inversion," IEEE 55th Vehicular Technology Conference, Birmingham, Alabama, May 6-9, 2002, pp. 35-39.
Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Iserte, P., et al., "Joint beamforming strategies in OFDM-MIMO systems," Acoustics, Speech, and Signal Processing, 1993. ICASSP-93., 1993 IEEE International Conference on, vol. 3, sections 2-3, Apr. 27-30, 1993, doi: 10.1109/ICASSP.2002.1005279.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.

Jongren, G. et al.: "Utilizing Quantized Feedback Information in Orthogonal Space-Time Block Coding," 2000 IEEE Global Telecommunications Conference, 2(4): 995-999, Nov. 27, 2000.

Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.

Kousa M, et al., "Multichannel Adaptive System", IEEE Proceedings I. Solid-State & Electron Devices, Institution of Electrical Engineers. Stevenage, GB, vol. 140, No. 5, Part 1, Oct. 1, 1993, pp. 357-364, XP000403498, SSN: 0956-3776.

Le Goff S et al: "Turbo-codes and high spectral efficiency modulation" Communications, 1994. ICC "94, Supercomm/ICC "94, Conference Record, "Serving Humanity Through Communications." IEEE International Conference on New Orleans, LA, USA May 1-5 1994, New York, NY, USA. IEEE, May 1, 1994, pp. 645-649, XP010126658 ISBN: 978-0-78031825-0.

Lebrun G., et al., "MIMO transmission over a time varying TDD channel using SVD," Electronics Letters, 2001, vol. 37, pp. 1363-1364.

Li, Lihua, et al., "A practical space-frequency block coded OFDN scheme for fast fading broadband channels," 2002. The 13th IEEE International Symposium on Personal, Indoor and Mobile Radio communications, vol. 1, Sep. 15-18, 2002. pp. 212-216 vol. 1.

Li, Ye et. al., "Simplified Channel Estimation for OFDM Systems with Multiple Transmit Antennas," IEEE Transactions on Wireless Communications, Jan. 2002, vol. 1, No. 1, pp. 67-75.

Miyashita, K. et al: "High data-rate transmission with eigenbeam-space division multiplexing (E-SDM) in a MIMO channel," VTC 2002-Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.

Office Action dated Aug. 13, 2008 for Australian Application Serial No. 2004223374, 2 pages.

Office Action dated Jun. 27, 2008 for Chinese Application Serial No. 200480011307.6, 3 pages.

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.

Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.

Singapore Search Report—SG200718746-1—Hungary Intellectual Patent Office—Aug. 12, 2011.

Supplementary European Search Report—EP06785006, Search Authority—The Hague Patent Office, Jul. 13, 2011.

Taiwan Search Report—TW095121422—TIPO—May 20, 2011.

Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

The Authoritative Dictionary of IEEE Standards Terms, Seventh Edition, IEEE Press: New York (Dec. 2000), p. 902.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.

Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.

Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.

Warner, W. et al.: "OfDM/FM Frame Synchronization for Mobile Radio Data Communication", IEEE Transactions on Vehicular Technology, Aug. 1993, vol. 42, No. 3, pp. 302-313.

Wolniansky, P.W.; Foschini, G.J.; Golden, G.D.; Valenzuela, R.A.; , "V-BLAST: an architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.

Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.

Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.

Wyglinski Physical Layer Loading Algorithms for Indoor Wireless Multicarrier Systems, p. 109 Nov. 2004.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

\* cited by examiner

CODING AND MODULATION FOR MULTIPLE DATA STREAMS IN A COMMUNICATION SYSTEM

CLAIM OF PRIORITY UNDER 35 U.S.C. §119

The present Application for Patent claims priority to Provisional Application Ser. No. 60/691,461, entitled "Coding and Modulation for Multiple Data Streams in a Communication System," filed Jun. 16, 2005, assigned to the assignee hereof, and expressly incorporated herein by reference.

BACKGROUND

I. Field

The present disclosure relates generally to communication, and more specifically to techniques for transmitting multiple data streams in a communication system.

II. Background

In a communication system, a transmitter may transmit multiple data streams via multiple transmission channels to a receiver. The transmitter typically encodes and modulates (or symbol maps) the data for each stream prior to transmission in order to combat deleterious channel conditions. The receiver performs the complementary demodulation and decoding to recover the data sent by the transmitter. The coding and modulation performed by the transmitter have a large impact on the performance of the data transmission.

Rate selection refers to the selection of an appropriate coding and modulation scheme for each data stream to achieve a specified level of performance, which may be quantified by a target packet error rate (PER). Rate selection is challenging because the transmission channels may experience different channel conditions (e.g., different fading, multipath, and interference effects) and may achieve different signal-to-noise-and-interference ratios (SNRs). The SNR of a transmission channel determines its transmission capability, which is typically quantified by a particular data rate that may be reliably sent on the transmission channel. If the SNR varies from transmission channel to transmission channel, then the supported data rate would also vary from channel to channel. Furthermore, if the channel conditions vary with time, then the data rates supported by the transmission channels would also vary with time.

There is therefore a need in the art for techniques to perform coding and modulation for multiple data streams in a manner to achieve good performance and to simplify rate selection.

SUMMARY

Techniques for transmitting multiple data streams to a single receiver using a single code rate and different modulation schemes are described herein. These techniques may simplify encoding and decoding, may simplify rate selection and/or reduce the amount of rate information to send, and may improve performance.

According to an embodiment of the disclosure, an apparatus is described which includes a controller and a processor. The controller obtains a selection of a single code rate and multiple modulation schemes for multiple data streams to be sent to a single receiver. The processor encodes the multiple data streams in accordance with the single code rate and modulates the multiple data streams in accordance with the multiple modulation schemes.

According to another embodiment, an apparatus is described which includes a processor and a controller. The processor determines channel estimates for multiple data streams to be sent to a single receiver. The controller selects a single code rate and multiple modulation schemes for the multiple data streams based on the channel estimates.

Various aspects and embodiments of the disclosure are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The data transmission and rate selection techniques described herein may be used for various multi-channel communication systems with multiple transmission channels. For example, these techniques may be used for a multiple-input multiple-output (MIMO) system, an orthogonal frequency division multiplex (OFDM) system, a MIMO system that utilizes OFDM (which is called a MIMO-OFDM system), a time division multiplex (TDM) system, a frequency division multiplex (FDM) system, a code division multiplex (CDM) system, and so on.

A MIMO system employs multiple (T) transmit antennas at a transmitter and multiple (R) receive antennas at a receiver for data transmission. A MIMO channel formed by the T transmit antennas and the R receive antennas may be decomposed into S spatial channels, where $S \leq \min\{T, R\}$. S transmission channels may be formed with the S spatial channels.

An OFDM system partitions the overall system bandwidth into multiple (K) orthogonal subbands, which are also called tones, subcarriers, bins, and frequency channels. Each subband is associated with a respective carrier that may be modulated with data. Up to K transmission channels may be formed with the K subbands. A MIMO-OFDM system has S spatial channels for each of the K subbands. Up to $S \cdot K$ transmission channels may be formed with the spatial channels of the K subbands in the MIMO-OFDM system.

In general, multiple transmission channels may be formed in the spatial, frequency, time, and/or code domains. For example, the multiple transmission channels may correspond to different spatial channels in a MIMO system, different wideband spatial channels in a MIMO-OFDM system, different subbands in an OFDM or FDM system, different time slots in a TDM system, different code channels in a CDM system, and so on. A transmission channel may also be called a physical channel, a traffic channel, a data channel, a parallel channel, or some other terminology. For clarity, portions of the following description are for a MIMO-OFDM system.

Figure 1:
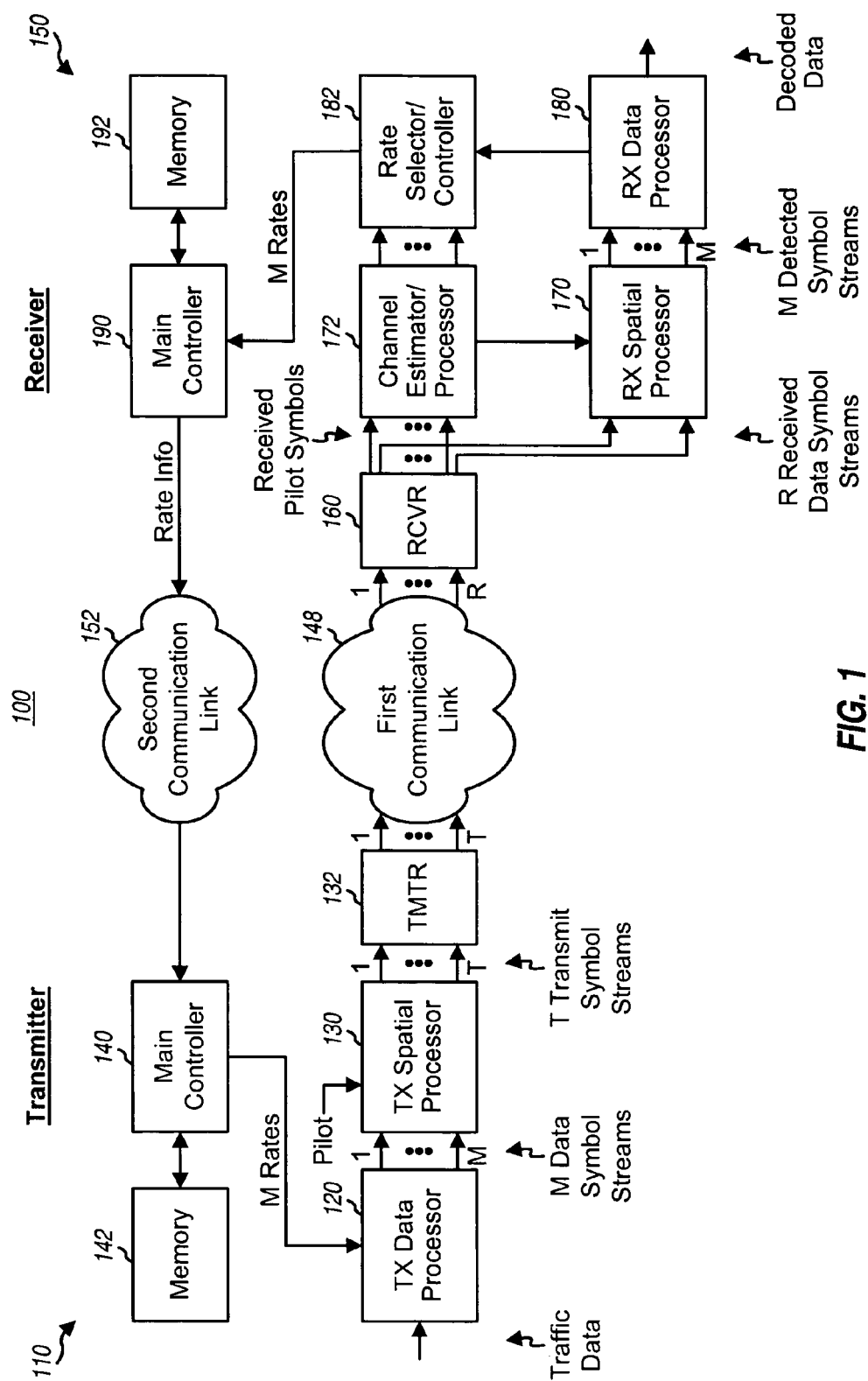
FIG. 1 shows a block diagram of a transmitter and a receiver in a multi-channel communication system according to an embodiment.

FIG. 1 shows a block diagram of a transmitter 110 and a receiver 150 in a multi-channel communication system 100 according to an embodiment. At transmitter 110, a TX data processor 120 receives traffic/packet data, processes (e.g., encodes, interleaves, and symbol maps) the traffic data in accordance with M rates from a main controller 140, and generates M streams of data symbols, where M>1. As used herein, a data symbol is a modulation symbol for traffic data, a pilot symbol is a modulation symbol for pilot (which is data that is known a priori by both the transmitter and receiver), a modulation symbol is a complex value for a point in a signal constellation for a modulation scheme (e.g., PSK or QAM), a transmit symbol is a symbol to be sent from one transmit antenna on one subband in one symbol period, and a symbol is a complex value. A TX spatial processor 130 multiplexes the M data symbol streams with pilot symbols, performs spatial processing on the data and pilot symbols (e.g., for eigensteering, no steering, or spatial spreading, which are described below), and provides T streams of transmit symbols, where T≧M. The M data symbol streams are for M data streams. The T transmit symbol streams are generated such that the M data streams are sent on M transmission channels.

A transmitter unit (TMTR) 132 processes the T transmit symbol streams (e.g., for OFDM) and generates T modulated signals, which are transmitted from T antennas and via a first communication link 148. Communication link 148 distorts the modulated signals with a channel response and further degrades the modulated signals with additive white Gaussian noise (AWGN) and possibly interference from other transmitters.

At receiver 150, R antennas receive the transmitted signals and provide R received signals to a receiver unit (RCVR) 160. Receiver unit 160 conditions and digitizes the R received signals and further processes the samples in a manner complementary to the processing performed by transmitter unit 132. Receiver unit 160 provides received pilot symbols to a channel estimator/processor 172 and R streams of received data symbols to a receive (RX) spatial processor 170. Channel estimator 172 derives channel estimates for communication link 148 and provides the channel estimates to RX spatial processor 170. RX spatial processor 170 performs receiver spatial processing on the R received data symbol streams with the channel estimates (e.g., using a full-CSI, CCMI, or MMSE technique, as described below) and provides M detected symbol streams, which are estimates of the M data symbol streams sent by transmitter 110. An RX data processor 180 processes (e.g., symbol demaps, deinterleaves, and decodes) the M detected symbol streams in accordance with the M rates selected for these streams and provides decoded data, which is an estimate of the traffic data sent by transmitter 110. RX data processor 180 may further provide decoding results (e.g., the status of each packet) to a rate selector/controller 182.

Main controllers 140 and 190 control the operation of various processing units at transmitter 110 and receiver 150, respectively. Memory units 142 and 192 store data and program codes used by controllers 140 and 190, respectively.

For rate selection/rate control, channel estimator 172 may process the received pilot symbols and possibly the detected data symbols and derive channel estimates, e.g. SNR estimates, for the transmission channels. Rate selector 182 receives the CHANNEL estimates and the decoding results, selects a single code rate for all M data streams and a modulation scheme for each data stream, and provides M rates for the M data streams to controller 190. The rate for each data stream indicates the code rate and the modulation scheme to use for that data stream.

Controller 190 sends rate information (e.g., the M rates) and possibly other information (e.g., acknowledgments (ACKs) for packets decoded correctly) via a second communication link 152 to transmitter 110. Controller 140 at transmitter 110 receives the rate information and provides the M rates to TX data processor 120. FIG. 1 shows the rate selection being performed by receiver 150. In general, the rate selection may be performed by receiver 150, or transmitter 110, or both.

In an aspect, a single code rate is selected for all M data streams and a different modulation scheme may be selected for each data stream. The M rates for the M data streams thus have the same code rate and may have the same or different modulation schemes. The use of a single code rate for all data streams may simplify the encoding at the transmitter and the decoding at the receiver, may simplify rate selection and/or reduce the amount of rate feedback, and may improve performance for the data streams.

The system may support a set of code rates. Each code rate may be associated with a specific coding scheme and a specific amount of redundancy. The supported code rates may be associated with (1) different coding schemes or (2) the same coding scheme but different puncture rates. A coding scheme may comprise a convolutional code, a Turbo code, a block code, some other code, or a combination thereof.

Table 1 shows an exemplary set of rates supported by the system. Each supported rate is associated with a specific data rate, a specific code rate, a specific modulation scheme, and a specific minimum SNR required to achieve the desired level of performance. The data rate may be given in number of information bits per modulation symbol (bits/sym). The desired level of performance may be quantified by a target PER, e.g., 1% PER for a non-fading, AWGN channel. The required SNR for each rate may be obtained via computer simulation, empirical measurements, computation, and/or some other means and for a specific system design (e.g., the specific code rate, interleaving scheme, and modulation scheme used for that rate) and an AWGN channel.

For the example shown in Table 1, four code rates of ¼, ½, ¾ and ⅞ are supported. Modulation schemes of BPSK, QPSK, 16-QAM, 64-QAM, and 256-QAM may be used with code rates ¼, ½ and ¾. Modulation schemes of QPSK, 16-QAM, 64-QAM, and 256-QAM may be used with code rate ⅞. Hence, only certain rates (or code rate and modulation pairs) are allowed. In general, the system may support any set of code rates, which may include code rates not listed in Table 1 such as code rates 7/12, ⅝, ⅚, and so on. Furthermore, the system may allow any set of modulation schemes to be used with each code rate. Table 1 also shows the required SNRs for some rates.

TABLE 1

Rate Set

| Data Rate (bits/sym) | Code Rate | MOD Scheme | Required SNR (dB) | Data Rate (bits/sym) | Code Rate | MOD Scheme | Required SNR (dB) |
|---|---|---|---|---|---|---|---|
| 0.25 | ¼ | BPSK | −1.8 | 0.5 | ½ | BPSK | 0.6 |
| 0.5 | ¼ | QPSK | 1.2 | 1.0 | ½ | QPSK | 2.9 |

TABLE 1-continued

Rate Set

| Data Rate (bits/sym) | Code Rate | MOD Scheme | Required SNR (dB) | Data Rate (bits/sym) | Code Rate | MOD Scheme | Required SNR (dB) |
|---|---|---|---|---|---|---|---|
| 1.0 | ¼ | 16-QAM | 7.2 | 2.0 | ½ | 16-QAM | 8.7 |
| 1.5 | ¼ | 64-QAM | 13.2 | 3.0 | ½ | 64-QAM | 14.4 |
| 2.0 | ¼ | 256-QAM | 19.2 | 4.0 | ½ | 256-QAM | 19.9 |
| 0.75 | ¾ | BPSK | 3.8 | 1.75 | ⅞ | QPSK | 8.7 |
| 1.5 | ¾ | QPSK | 6.4 | 3.5 | ⅞ | 16-QAM | 15.8 |
| 3.0 | ¾ | 16-QAM | 13.6 | 5.25 | ⅞ | 64-QAM | 22.0 |
| 4.5 | ¾ | 64-QAM | 19.2 | 7.0 | ⅞ | 256-QAM | 28.0 |
| 6.0 | ¾ | 256-QAM | 26.1 | | | | |

Figure 2:
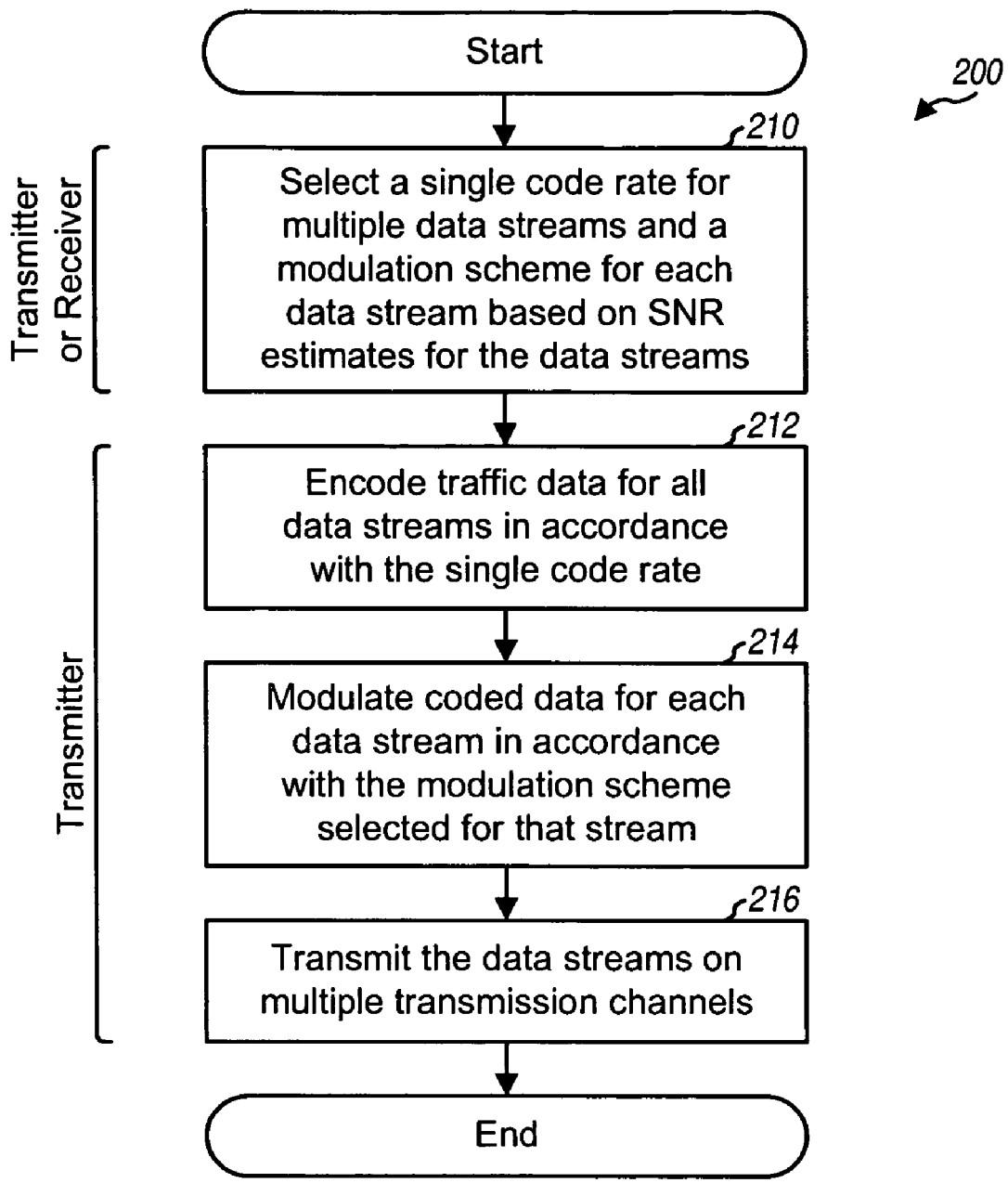
FIG. 2 shows a process for transmitting multiple data streams to a single receiver using a single code rate and different modulation schemes according to an embodiment.

FIG. 2 shows a process 200 for transmitting multiple (M) data streams to a single receiver using a single code rate and different modulation schemes according to an embodiment. A single code rate is selected for all M data streams and a modulation scheme is selected for each data stream based on channel estimates, e.g. SNR estimates, for these data streams (block 210). The estimates for the data streams may be dependent on the number of data streams being transmitted, the receiver spatial processing technique used by the receiver, and so on, as described below. The rate selection may be performed in various manners, as also described below.

The rate selection in block 210 may be performed by the receiver, and the selected rates may be sent back to the transmitter, as shown in FIG. 1. Alternatively, the rate selection may be performed by the transmitter based on information obtained from/for the receiver. For example, in a time division duplexed (TDD) system, the transmit link from the transmitter to the receiver and the receive link from the receiver to the transmitter may be assumed to be reciprocal of one another. In this case, the transmitter may derive channel estimates, e.g. SNR estimates, for the receive link based on a pilot received from the receiver. The transmitter may then derive estimates for the transmit link based on the estimates for the receive link and an asymmetric parameter indicative of the difference, e.g. the differences in the SNRs for the two links. The transmitter may then select the rates for the data streams based on the estimates for the transmit link. The transmitter and receiver may also jointly perform rate selection.

Regardless of how the rate selection is performed, the transmitter obtains the rates selected for the data streams. The transmitter then encodes the traffic data for all data streams in accordance with the single code rate selected for these data streams (block 212). The transmitter then modulates (or symbol maps) the coded data for each data stream in accordance with the modulation scheme selected for that stream (block 214). The transmitter further processes the data streams (e.g., for spatial transmission, OFDM, and so on) and transmits these data streams on multiple transmission channels (block 216).

The rate selection in block 210 may be performed at the start of a data transmission, in each frame or time slot, at designated times, and so on. The coding and modulation for the data streams are adjusted whenever new rates are selected for these data streams.

Different numbers of data streams (e.g., one, two, three, or more data streams) may be transmitted simultaneously. The data streams may interfere with one another, e.g., if these data streams are sent on multiple spatial channels of a MIMO channel. The highest overall throughput may be achieved by transmitting the maximum number of data streams or possibly fewer data streams, depending on the channel conditions and the amount of interference among these data streams.

Figure 3:
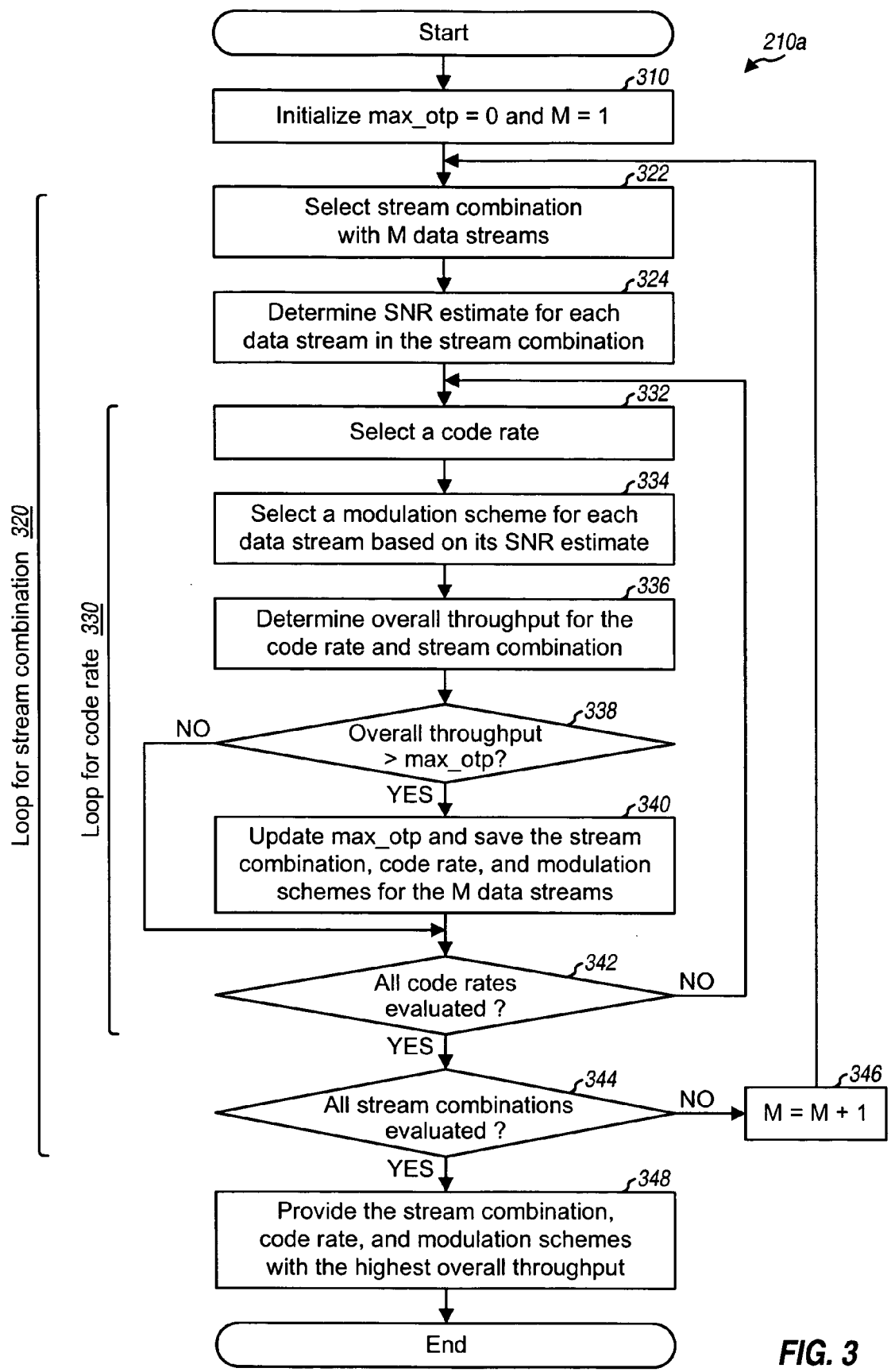
FIG. 3 shows a process for selecting the rates for the multiple data streams with independent rate per stream according to an embodiment.

FIG. 3 shows a process 210a for selecting the rates for the data streams in a system with independent rate per stream according to an embodiment. Process 210a is an embodiment of block 210 in FIG. 2. Process 210a evaluates different numbers of data streams and different code rates and selects the number of data streams and the code rate that provide the highest overall throughput and are supported by the channel conditions. Each different number of data streams is also called a stream combination or a stream hypothesis. The number of stream combinations to evaluate is typically dependent on the number of transmission channels available for data transmission. For example, in a MIMO system with S spatial channels, S stream combinations for 1, 2, ..., and S data streams may be evaluated. The code rates to evaluate may be code rates ¼, ½, ¾ and ⅞ for the example shown in Table 1.

Initially, a variable max_otp used to store the current highest overall throughput is initialized to zero, or max_otp=0 (block 310). A variable M used to denote the number of data streams to transmit is initialized to one, or M=1 (also block 310).

A loop 320 evaluates one stream combination at a time, starting with the fewest number of data streams (or M=1) for the first iteration of this loop. A stream combination with M data streams is selected for evaluation (block 322). For this stream combination, an SNR estimate is determined for each data stream with the assumption that M data streams will be sent on M transmission channels (block 324). SNR estimation is described below.

A loop 330 evaluates one code rate at a time, e.g., starting with the lowest code rate for the first iteration of this loop. A code rate is selected for evaluation (block 332). For the current code rate, a modulation scheme is selected for each of the M data streams based on the SNR estimate for that data stream and possibly the SNR estimates for the other data streams (block 334). For example, the SNR estimate for each data stream may be compared against the required SNR for each modulation scheme allowed for the current code rate, and the highest order modulation scheme with a required SNR that is less than or equal to the SNR estimate may be selected for that data stream. Other schemes for selecting the modulation schemes for the M data streams are described below.

After selecting the modulation schemes for the M data streams, the data rate for each data stream is determined based on the modulation scheme selected for that data stream and the current code rate. The overall throughput for the current code rate is then computed as the sum of the data rates for the M data streams (block 336). If this overall throughput is greater than the current max_otp, as determined in block 338, then max_otp is updated with this overall throughput, and the current stream combination, the current code rate, and the modulation schemes for the M data streams are saved (block 340).

A determination is then made whether all code rates have been evaluated (block 342). If the answer is 'No', then the process returns to block 332 to evaluate another code rate, e.g., the next higher code rate. Otherwise, if all code rates have been evaluated for the current stream combination, then a determination is made whether all stream combinations have been evaluated (block 344). If the answer is 'No', then variable M is incremented as M=M+1 (block 346), and the process returns to block 322 to evaluate another stream combination. Otherwise, if all stream combinations have been evaluated, then the stream combination, code rate, and modulation schemes with the highest overall throughput are provided for use (block 348).

Multiple code rates for a given stream combination may have the same highest overall throughput. In this case, the most robust code rate (which is the lowest code rate) among these multiple code rates may be selected. This may be achieved by (1) evaluating the code rates in sequential order starting with the lowest code rate and (2) saving a higher code rate only if the overall throughput is higher, as shown in FIG. 3.

Multiple stream combinations may also have the same highest overall throughput. In an embodiment, the stream combination with the fewest number of data streams is selected when multiple stream combinations have the same highest overall throughput. This may be achieved by (1) evaluating the stream combinations in sequential order starting with the stream combination having the fewest data steams and (2) saving a stream combination only if the overall throughput is higher, as shown in FIG. 3.

In another embodiment, the stream combination with the largest total SNR margin is selected when multiple stream combinations have the same highest overall throughput. The SNR margin for each data stream m may be expressed as:

$$SNR_{margin}(m) = SNR_{est}(m) - SNR_{req}(R_m), \text{ for } m=1, \ldots, M, \quad \text{Eq (1)}$$

where
$R_m$ is the rate selected for data stream m;
$SNR_{est}(m)$ is the SNR estimate for data stream m;
$SNR_{req}(R_m)$ is the required SNR for rate $R_m$; and
$SNR_{margin}(m)$ is the SNR margin for data stream m.
$SNR_{est}(m)$, $SNR_{req}(R_m)$, and $SNR_{margin}(m)$ are given in units of decibel (dB). The total SNR margin for all M data streams may be expressed as:

$$SNR_{total\_margin} = \sum_{m=1}^{M} SNR_{margin}(m). \quad \text{Eq (2)}$$

In yet another embodiment, when multiple stream combinations have the same highest overall throughput, a stream combination with more data streams is selected if its total SNR margin exceeds the total SNR margin of another stream combination with fewer data streams by a predetermined amount, which is denoted as Δmargin. In general, when multiple stream combinations have the same highest overall throughput, a steam combination with fewer data streams may be selected to reduce crosstalk among these streams and to simplify the processing at the transmitter and receiver. However, a stream combination with more data streams may be selected if improved performance (higher overall throughput, higher total SNR margin, and so on) can be achieved.

In general, when multiple stream combinations have the same highest overall throughput, any one, any combination, or all of the embodiments/criteria described above (code rate, number of streams, SNR margin, and so on) may be used to select one stream combination. For example, if multiple stream combinations have the same highest overall throughput, then (1) the stream combinations with the smallest number of streams may be selected, then (2) from those selected stream combinations the stream combinations with the highest SNR margin for say the lowest stream may be selected, then (3) from those selected stream combinations the stream combinations with the most robust code rate may be selected, and so on, until only one stream combination is selected.

In an embodiment of rate selection, which is shown in FIG. 3, a modulation scheme is independently selected for each data stream based solely on the SNR estimate for that data stream. This embodiment may be used, e.g., if the system allows for independent rate selection per stream and each data stream is independently encoded (described below). Selecting a modulation scheme with a positive SNR margin for each data stream ensures that each data stream can be reliably received.

In another embodiment of rate selection, the modulation schemes for the M data streams are selected with margin sharing. This embodiment may be used, e.g., if the system allows for independent rate selection per stream and the data streams are jointly encoded (described below). For this embodiment, a modulation scheme is initially selected for each data stream based on the SNR estimate for that data stream, as described above. The SNR margin for each data stream is determined as shown in equation (1). The total SNR margin for all M data streams is then computed as shown in equation (2). The total SNR margin is distributed to one or more data streams to allow a higher order modulation scheme to be selected for each of the one or more data streams, if possible.

The distribution of the total SNR margin may be performed in various manners. In a first scheme for margin sharing, the M data streams are sorted in descending order based on their SNR estimates, from highest to lowest SNR estimates. The sorted data streams are then selected one at a time for possible promotion, starting with the data stream having the highest SNR estimate. A promote SNR is computed for the selected data stream as the difference between the required SNR for the next, higher order modulation scheme (if any) and the required SNR for the modulation scheme initially selected for this data stream. If the promote SNR is less than or equal to the total SNR margin, then the selected data stream is promoted to the next higher order modulation scheme, and the total SNR margin is reduced by the promote SNR. The selected data stream is thus allocated sufficient SNR margin to select the next higher order modulation scheme. The same processing is repeated for each remaining data stream until no data stream can be promoted.

In a second scheme for margin sharing, the M data streams are sorted in ascending order based on their SNR estimates, from lowest to highest SNR estimates. The sorted data streams are then selected one at a time for possible promotion, starting with the data stream having the lowest SNR estimate.

In a third scheme for margin sharing, the M data streams are sorted in ascending order based on their differential SNRs, from lowest to highest differential SNRs. The differential SNR for a data stream is the difference between the required SNR for the next higher order modulation scheme and the SNR estimate for the data stream. The sorted data streams are then selected one at a time for possible promotion, starting with the data stream having the lowest differential SNR. This scheme attempts to promote first the data stream that needs the least amount of SNR margin for promotion, which may improve performance and allow more data streams to be promoted.

In a fourth scheme for margin sharing, the M data streams are sorted in ascending order based on their promote SNRs, from lowest to highest promote SNRs. The sorted data streams are then selected one at a time for possible promotion, starting with the data stream having the lowest promote SNR. This scheme attempts to promote first the data stream having the smallest promote SNR, which may allow more data streams to be promoted.

Other schemes for performing margin sharing may also be used, and this is within the scope of the disclosure. In general, the total SNR margin may be distributed to the M data streams in various order and manners. In an embodiment, a data stream may be promoted to a modulation scheme that is more than one order higher. For example, the selected data stream may be promoted as much as possible based on the total SNR margin. In another embodiment, the amount of SNR margin that may be allocated to a data stream is limited to be within a predetermined value $SNR_{allo\_max}$. $SNR_{allo\_max}$ limits the amount of negative SNR margin observed by any data stream and ensures that no data stream will be sent at a rate with a required SNR that is excessively above the SNR estimate for that data stream. $SNR_{allo\_max}$ may be a fixed value for all code rates. Alternatively, $SNR_{allo\_max}$ may be a variable value that is a function of code rate so that a smaller $SNR_{allo\_max}$ may be used for a less robust code rate (e.g., code rate 7/8) and a larger $SNR_{allo\_max}$ may be used for a more robust code rate (e.g., code rate 1/2).

A system may allow only certain combinations of rates, e.g., in order to reduce the amount of rate information to send back to the transmitter. The set of rate combinations allowed by the system is often called a vector-quantized rate set. Table 2 shows an exemplary vector-quantized rate set for a system in which the transmitter can transmit up to four data streams and code rates of 1/4, 1/2 and 3/4 may be selected. For each rate combination, the overall throughput (OTP), the number of data streams to transmit (Num Str), the code rate to use for all data streams, and the modulation scheme to use for each data stream are given in Table 2. In Table 2, "B" denotes BPSK, "Q" denotes QPSK, "16" denotes 16-QAM, "64" denotes 64-QAM, and "256" denotes 256-QAM. As an example, for the rate combination with an overall throughput of 19.5 information bits/symbol period, four data streams are transmitted, code rate 3/4 is used for all four data streams, 256-QAM is used for data streams 1 and 2, 64-QAM is used for data stream 3, and 16-QAM is used for data stream 4. For rate combinations with just one data stream, all or a subset of the rates shown in Table 1 may be supported. The rate set may also be defined to cover other code rates such as, for example, code rates 7/12, 5/8, 5/6, 7/8, and so on.

TABLE 2

Vector-Quantized Rate Set

| OTP | Num Str | Code Rate | MOD for Stream 1 | 2 | 3 | 4 |
|---|---|---|---|---|---|---|
| 1.0 | 2 | 1/4 | Q | Q | — | — |
| 1.5 | 2 | 1/2 | Q | B | — | — |
| 2.0 | 2 | 1/2 | Q | Q | — | — |
| 3.0 | 2 | 1/2 | 16 | Q | — | — |

TABLE 2-continued

Vector-Quantized Rate Set

| OTP | Num Str | Code Rate | MOD for Stream 1 | 2 | 3 | 4 |
|---|---|---|---|---|---|---|
| 3.0 | 2 | 3/4 | Q | Q | — | — |
| 4.5 | 2 | 3/4 | 16 | Q | — | — |
| 5.25 | 2 | 3/4 | 64 | B | — | — |
| 6.0 | 2 | 3/4 | 64 | Q | — | — |
| 7.5 | 2 | 3/4 | 64 | 16 | — | — |
| 9.0 | 2 | 3/4 | 64 | 64 | — | — |
| 9.0 | 2 | 3/4 | 256 | 16 | — | — |
| 10.5 | 2 | 3/4 | 256 | 64 | — | — |
| 12.0 | 2 | 3/4 | 256 | 256 | — | — |
| 6.0 | 3 | 1/2 | 64 | 16 | Q | — |
| 7.0 | 3 | 1/2 | 64 | 64 | Q | — |
| 7.0 | 3 | 1/2 | 256 | 16 | Q | — |
| 9.0 | 3 | 1/2 | 256 | 64 | 16 | — |
| 9.75 | 3 | 3/4 | 64 | 64 | B | — |
| 12.0 | 3 | 3/4 | 64 | 64 | 16 | — |
| 12.0 | 3 | 3/4 | 256 | 64 | Q | — |
| 13.5 | 3 | 3/4 | 256 | 64 | 16 | — |
| 13.5 | 3 | 3/4 | 256 | 256 | Q | — |
| 15.0 | 3 | 3/4 | 256 | 256 | 16 | — |
| 16.5 | 3 | 3/4 | 256 | 256 | 64 | — |
| 7.5 | 4 | 1/2 | 64 | 16 | Q | B |
| 9.0 | 4 | 1/2 | 64 | 64 | 16 | Q |
| 11.0 | 4 | 1/2 | 64 | 64 | 64 | 16 |
| 10.5 | 4 | 3/4 | 64 | 16 | Q | Q |
| 13.5 | 4 | 3/4 | 64 | 64 | 16 | Q |
| 13.5 | 4 | 3/4 | 256 | 64 | Q | Q |
| 15.0 | 4 | 3/4 | 256 | 64 | 16 | Q |
| 18.0 | 4 | 3/4 | 256 | 64 | 64 | 16 |
| 19.5 | 4 | 3/4 | 256 | 256 | 64 | 16 |
| 21.0 | 4 | 3/4 | 256 | 256 | 256 | 16 |

Figure 4:
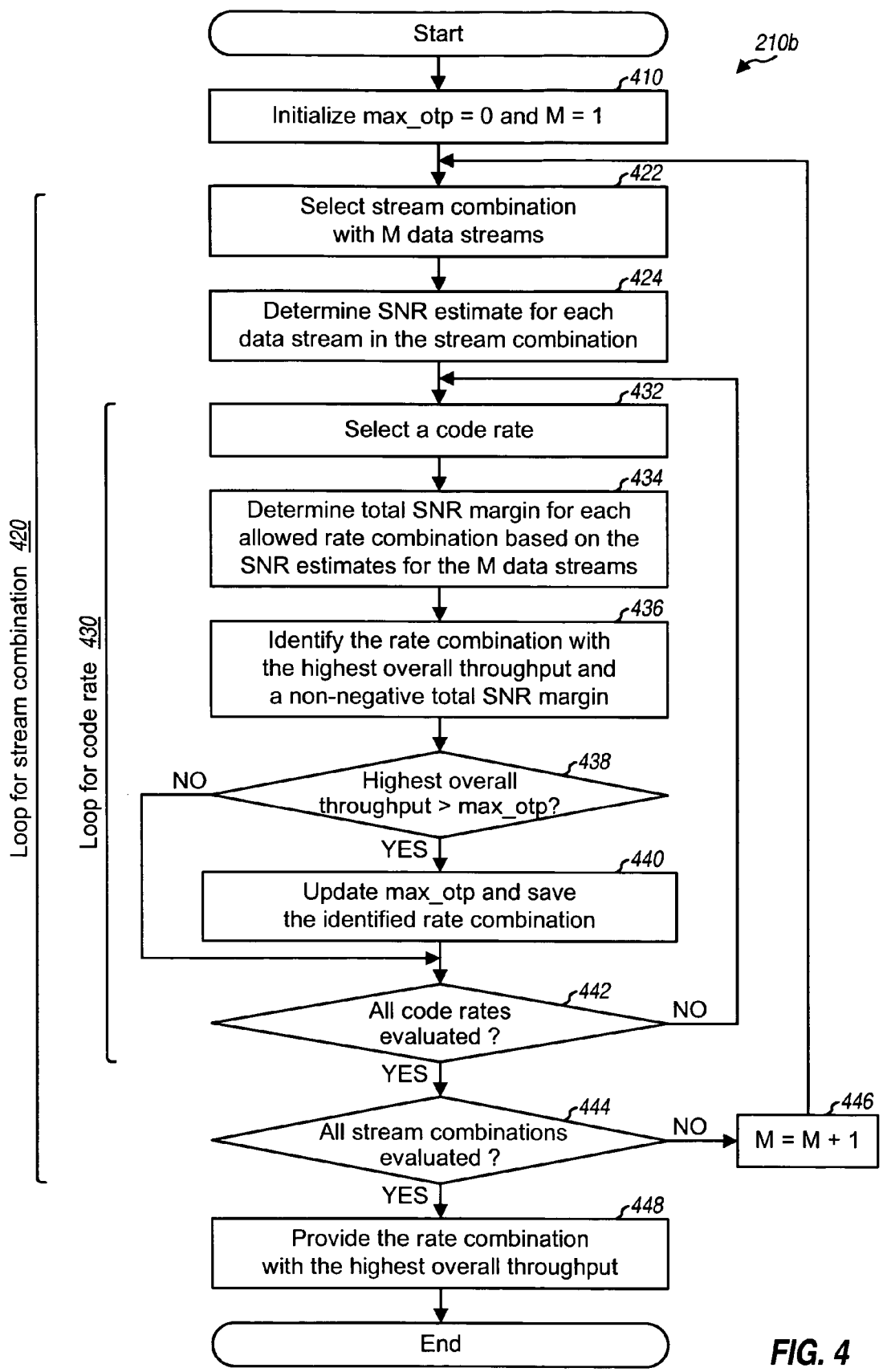
FIG. 4 shows a process for selecting the rates for the multiple data streams with a vector-quantized rate set according to an embodiment.

FIG. 4 shows a process 210b for selecting the rates for the data streams in a system with a vector-quantized rate set according to an embodiment. Process 210b is another embodiment of block 210 in FIG. 2. Process 210b evaluates different stream combinations and different code rates based on the rate set supported by the system and selects the rate combination that provides the highest overall throughput and is supported by the channel conditions.

Initially, the variable max_otp is initialized to zero, and the variable M is initialized to one (block 410). For the first iteration of loop 420, a stream combination with M data streams is selected for evaluation (block 422), and an SNR estimate is determined for each of the M data streams (block 424). Loop 430 is then performed once for each code rate that may be selected for the current stream combination.

For each iteration of loop 430, a code rate is selected for evaluation, e.g., starting with the lowest code rate allowed for the current stream combination (block 432). For the current code rate, the total SNR margin for each allowed rate combination is determined based on the SNR estimates for the M data streams (block 434). The total SNR margin for a given rate combination with M data streams may be determined as follows. The SNR margin for each data stream m in the rate combination is first computed as shown in equation (1), where $SNR_{req}(R_m)$ is the required SNR for the rate specified for data stream m by the rate combination. Because the rate for each data stream in the rate combination is specified, the SNR margin for each data stream may be a positive or negative value. If the SNR margin for any data stream in the rate combination is worse than a predetermined value (e.g., −2 dB), then that rate combination may be discarded. This predetermined value may be a fixed value or a variable value that is a function of code rate. For example, a more negative value (e.g., −3 dB) may be used for a more robust code rate (e.g., code rate ½), and a less negative value (e.g., −1 dB) may be used for a less robust code rate (e.g., code rate ¾). The total SNR margin is then computed as the sum of the SNR margins for the M data streams, as shown in equation (2).

The rate combination with the highest overall throughput and a non-negative total SNR margin is identified (block 436). If multiple rate combinations have the same overall throughput, then the rate combination with the largest total SNR margin among these multiple rate combinations is selected. If the highest overall throughput is greater than the current max_otp, as determined in block 438, then max_otp is updated with this overall throughput, and the rate combination with this highest overall throughput is saved (block 440).

A determination is then made whether all code rates have been evaluated (block 442). If the answer is 'No', then the process returns to block 432 to evaluate another code rate. Otherwise, if all code rates have been evaluated for the current stream combination, then a determination is made whether all stream combinations have been evaluated (block 444). If the answer is 'No', then variable M is incremented as M=M+1 (block 446), and the process returns to block 422 to evaluate another stream combination. Otherwise, if all stream combinations have been evaluated, then the rate combination with the highest overall throughput is provided for use (block 448).

Multiple rate combinations for a given stream combination may achieve the same highest overall throughput and have non-negative total SNR margins. In this case, the rate combination with the most robust code rate or the rate combination with the largest total SNR margin may be selected. Multiple rate combinations for different stream combinations may achieve the same highest overall throughput and have non-negative total SNR margins. In this case, the rate combination with the fewest data streams, the rate combination with the largest total SNR margin, the rate combination with more data streams but a larger total SNR margin by Δmargin, or some other rate combination may be selected.

In another embodiment for selecting rates in a system with a vector-quantized rate set, the rate set is ordered by required SNR for a designated data stream (e.g., the first data stream), for example from lowest required SNR to highest required SNR on the designated data stream. A minimum SNR margin of $SNR_{margin\_min}$ may be imposed on the designated data stream. The rate combinations in the rate set may be evaluated, one at a time, according to the schemes described above and in addition, by comparing the first data stream's SNR margin (which is the required SNR minus the actual SNR for the first data stream) against the minimum SNR margin. Since the rate combinations are ordered by the first data stream's required SNR, from lowest to highest, the SNR margin is progressively worse. Hence, upon encountering a rate combination with the first data stream having an SNR margin worse than the minimum SNR margin, the remaining rate combinations can be ignored since the first data stream for these rate combinations will have SNR margin worse than the minimum SNR margin. This ordering reduces the number of rate combinations that are evaluated. One of the rate combinations whose first data stream's SNR margin is better than $SNR_{margin\_min}$ may then be selected using any of the techniques described above. The rate combinations may be ordered by the required SNR for any data stream, and not necessarily the first data stream. Furthermore, the ordering may be performed across all rate combinations in the rate set or just the rate combinations for each code rate.

In yet another embodiment for selecting rates in a system with a vector-quantized rate set, a total required SNR is computed for each rate combination as the sum of the required SNRs for the rates specified for all of the data streams in that rate combination. The total required SNR and the overall throughput for each rate combination in the rate set may be stored in a look-up table. For rate selection, a total SNR estimate is computed as the sum of the SNR estimates for all M data streams. The rate combination with the highest overall throughput and a total required SNR that is less than or equal to the total SNR estimate is then selected. This embodiment does not limit the amount of SNR margin that may be allocated to each data stream.

Exemplary embodiments for performing rate selection for a system with independent rate per stream and a system with a vector-quantized rate set have been described above. The rate selection may also be performed in other manners, with and without margin sharing.

Figure 5:
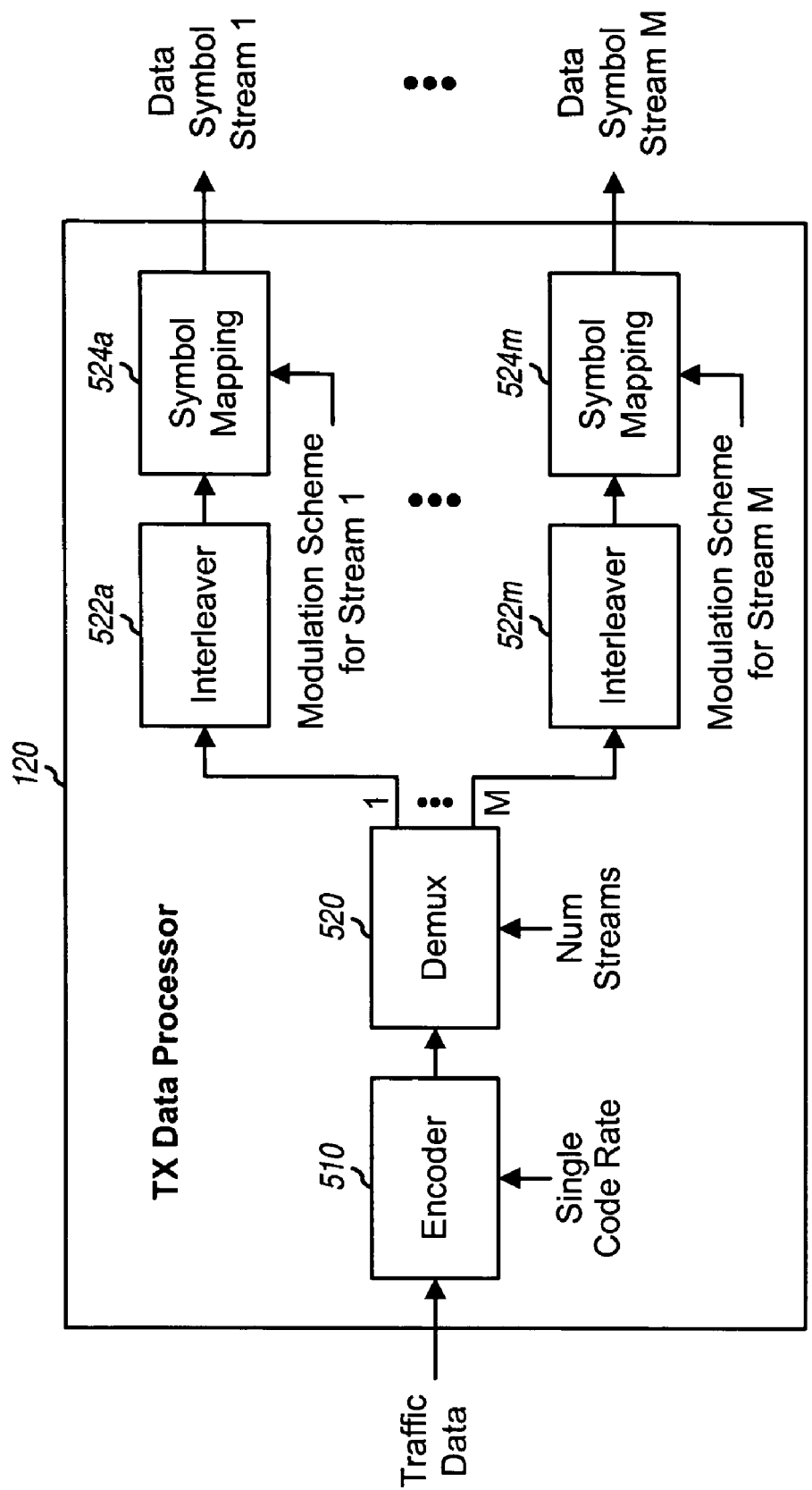
FIG. 5 shows a block diagram of a transmit (TX) data processor according to an embodiment.

FIG. 5 shows a block diagram of an embodiment of TX data processor 120 at transmitter 110 according to an embodiment. TX data processor 120 includes an encoder 510, a demultiplexer (Demux) 520, and M pairs of interleaver 522 and symbol mapping unit 524 for the M data streams. Encoder 510 encodes the traffic data in accordance with the single code rate and generates code bits. The single code rate may include a convolutional code, a Turbo code, a low density parity check (LDPC) code, a cyclic redundancy check (CRC) code, a block code, and so on, or a combination thereof. In an embodiment, encoder 510 implements a rate ½ binary convolutional encoder that generates two code bits for each data bit. A puncturing unit (not shown in FIG. 5) then punctures or deletes as many code bits as necessary to achieve the single code rate. Demultiplexer 520 receives the code bits from encoder 510, demultiplexes the code bits into M streams, and provides the M code bit streams to M interleavers 522a through 522m.

Encoder 510 encodes each packet of traffic data separately and the coded packet may be sent on one or multiple data streams. If each of the M data streams is independently encoded and modulated, then encoder 510 may be operated M times to separately encode the packets for the M data streams, and demultiplexer 520 provides each coded packet to one interleaver 522 for one data stream. Alternatively, M separate encoders may be used for the M data streams (not shown in FIG. 5). If the M data streams are jointly encoded but independently modulated, then encoder 510 encodes each packet, and demultiplexer 520 partitions each coded packet into multiple subpackets or blocks and provides these subpackets to different interleavers 522. In any case, each interleaver 522 interleaves or reorders the code bits in its stream in accordance with an interleaving scheme and provides interleaved bits to an associated symbol mapping unit 524. Each symbol mapping unit 524 maps the interleaved bits in accordance with the modulation scheme selected for its stream and provides a stream of data symbols. M symbol mapping units 524a through 524m provide M data symbol streams.

The data transmission and rate selection techniques described herein may be used for various systems and various types of transmission channels. The frequency response of a frequency-selective transmission channel m may be given by $h_m(k)$ for k=1, . . . , K, where $h_m(k)$ is the complex channel gain for subband k of transmission channel m. The received SNR for each subband k of transmission channel m, $\gamma_m(k)$, may be expressed as:

$$\gamma_m(k) = 10\log_{10}\left(P_m(k) \cdot \frac{|h_m(k)|^2}{N_0}\right), \quad \text{Eq (3)}$$

for $k = 1, \ldots, K$ and $m = 1, \ldots, S$, where $P_m(k)$ is the transmit power used for subband k of transmission channel m and $N_0$ is the noise variance at the receiver. Equation (3) shows an exemplary expression for received SNR. In general, a received SNR expression may include terms for various factors. For example, in a MIMO system, the received SNR is dependent on the spatial processing performed by the transmitter and the receiver, as described below. The received SNR in equation (3) and other SNR quantities in the following description are given in units of dB.

One data stream may be sent on each transmission channel. An SNR estimate may be derived for each data stream/transmission channel in various manners. An embodiment for deriving the SNR estimate is described below. For this embodiment, the average SNR for each data stream m, $\gamma_{avg,m}$, is computed as:

$$\gamma_{avg,m} = \frac{1}{K} \cdot \sum_{k=1}^{K} \gamma_m(k). \quad\quad\quad \text{Eq (4)}$$

The variance of the received SNRs for each data stream m, $\sigma_{snr,m}^2$, may be computed as:

$$\sigma_{snr,m}^2 = \frac{1}{(K-1)} \cdot \sum_{k=1}^{K} (\gamma_m(k) - \gamma_{avg,m})^2. \quad\quad\quad \text{Eq (5)}$$

The SNR estimate for each data stream m, $SNR_{est}(m)$, may then be computed as:

$$SNR_{est}(m) = \gamma_{avg,m} - \gamma_{bo,m}, \quad\quad\quad \text{Eq (6)}$$

where $\gamma_{bo,m}$ is a back-off factor for data stream m. The back-off factor $\gamma_{bo,m}$ may be used to account for variability in the received SNRs across the data stream and may be computed as a function of the average SNR and the SNR variance, e.g., $\gamma_{os,m} = K_{bo} \cdot \sigma_{snr,m}^2$ where $K_{bo}$ is a constant. The back-off factor may also account for other factors such as, for example, the diversity order for the data stream, the coding and interleaving schemes used for the data stream, the packet size, and so on.

For a MIMO-OFDM system, the MIMO channel between the transmitter and the receiver may be characterized by a set of K channel response matrices, $H(k)$ for k=1, . . . , K. Each channel response matrix $H(k)$ has a dimension of R×T and contains a complex gain between each transmit antenna and each receive antenna for subband k. Each matrix $H(k)$ includes S spatial channels, where $S \leq \min\{T, R\}$. Up to S wideband spatial channels may be formed for the MIMO channel, where each wideband spatial channel includes one spatial channel for each of the K subbands. For example, each wideband spatial channel may correspond to the K subbands of one transmit antenna. As another example, each wideband spatial channel may include one eigenmode for each of the K subbands. Each wideband spatial channel may be used as a transmission channel.

For MIMO and MIMO-OFDM systems, different transmission channels may be formed with the transmitter performing different spatial processing. For example, the transmitter may perform eigensteering, no steering, or spatial spreading.

For eigensteering, the channel response matrix $H(k)$ for each subband may be diagonalized by performing eigenvalue decomposition, as follows:

$$R(k) = H^H(k) \cdot H(k) = E(k) \cdot \Lambda(k) \cdot E^H(k), \quad\quad\quad \text{Eq (7)}$$

where $E(k)$ is a unitary matrix of eigenvectors, $\Lambda(k)$ is a diagonal matrix, and "H" denotes the conjugate transpose. The transmitter may transmit data on up to S orthogonal spatial channels (or eigenmodes) of each subband k using $E(k)$. The diagonal matrix $\Lambda(k)$ for each subband k contains the power gains for the S eigenmodes of $H(k)$. The channel response matrix $H(k)$ for each subband may also be diagonalized by performing singular value decomposition, as follows:

$$H(k) = U(k) \cdot \Sigma(k) \cdot E^H(k), \quad\quad\quad \text{Eq (8)}$$

where $U(k)$ is a unitary matrix of left singular vectors, $E(k)$ is a unitary matrix of right singular vectors (which is also the matrix of eigenvectors), and $\Sigma(k)$ is a diagonal matrix of channel gains for the S eigenmodes of $H(k)$.

For no steering, the transmitter transmits data without any spatial processing, e.g., transmits one data stream from each transmit antenna. For spatial spreading, the transmitter transmits data with different steering matrices $V(k)$ across subbands and/or symbol periods so that the data transmission observes an ensemble of effective channels.

Table 3 shows the spatial processing performed by the transmitter for eigensteering ("es"), no steering ("ns"), and spatial spreading ("ss") for one subband, with subband index k being omitted for clarity. s is a vector with up to S data symbols to be sent on one subband in one symbol period. $x_x$ is a vector with up to T transmit symbols to be sent from the T transmit antennas on one subband in one symbol period for mode x, where x may be "es", "ns" or "ss". $H_x$ is an effective channel response matrix observed by the data vector s for mode x.

TABLE 3

| | Transmitter Spatial Processing | | |
|---|---|---|---|
| | Eigensteering | No Steering | Spatial Spreading |
| Spatial Processing | $X_{es} = E \cdot s$ | $X_{ns} = s$ | $X_{ss} = V \cdot s$ |
| Effective Channel | $H_{es} = H \cdot E$ | $H_{ns} = H$ | $H_{ss} = H \cdot V$ |

The received symbols obtained by the receiver may be expressed as:

$$r_x = H \cdot x_x + n = H_x \cdot s + n, \quad\quad\quad \text{Eq (9)}$$

where $r_x$ is a vector of received symbols for mode x and n is a vector of noise, which may be assumed to be AWGN with a variance of $\sigma_n^2$.

Table 4 shows the spatial processing performed by the receiver to obtain detected symbols ŝ, which are estimates of the data symbols s. The full channel state information (full-CSI) technique may be used for eigensteering. The channel correlation matrix inversion (CCMI) and the minimum mean square error (MMSE) techniques may be used for eigensteering, no steering, and spatial spreading. For each technique, the receiver derives a spatial filter matrix M for each subband based on the actual or effective channel response matrix for that subband. The receiver then performs spatial matched filtering on the received symbols with the spatial filter matrix.

TABLE 4

Receiver Spatial Processing

| | Receiver Spatial Processing | Received SNR |
|---|---|---|
| Full-CSI | $\underline{M}_{es} = \underline{\Lambda}^{-1} \cdot \underline{E}^H \cdot \underline{H}^H$ | $\gamma_{es,m}(k) = 10\log_{10}\left(\frac{P_m(k) \cdot \lambda_m(k)}{\sigma_n^2}\right)$ |
| | $\hat{\underline{s}}_{es} = \underline{M}_{es} \cdot \underline{r}_{es}$ | |
| CCMI | $\underline{M}_{ccmi} = [\underline{H}_x^H \cdot \underline{H}_x]^{-1} \cdot \underline{H}_x^H$ | $\gamma_{ccmi,m}(k) = 10\log_{10}\left(\frac{P_m(k)}{r_m(k) \cdot \sigma_n^2}\right)$ |
| | $\hat{\underline{s}}_{ccmi} = \underline{M}_{ccmi} \cdot \underline{r}_x$ | |
| MMSE | $\underline{M}_{mmse} = [\underline{H}_x^H \cdot \underline{H}_x + \sigma_n^2 \cdot \underline{I}]^{-1} \cdot \underline{H}_x^H$ | $\gamma_{mmse,m}(k) = 10\log_{10}\left(\frac{q_m(k)}{1-q_m(k)} P_m(k)\right)$ |
| | $\underline{D}_{mmse} = [\text{diag}[\underline{M}_{mmse} \cdot \underline{H}_x]]^{-1}$ | |
| | $\hat{\underline{s}}_{mmse} = \underline{D}_{mmse} \cdot \underline{M}_{mmse} \cdot \underline{r}_x$ | |

Table 4 also shows the received SNR for each subband k of transmission channel m for the three receiver spatial processing techniques. For the full-CSI technique, $\lambda_m(k)$ is the m-th diagonal element of $\underline{\Lambda}(k)$. For the CCMI technique, $r_m(k)$ is the m-th diagonal element of $\underline{R}_x^{-1}(k)=[\underline{H}_x^H(k) \cdot \underline{H}_x(k)]^{-1}$. For the MMSE technique, $q_m(k)$ is the m-th diagonal element of $\underline{M}_{mmse}(k) \cdot \underline{H}_x(k)$. As indicated in Table 4, the received SNRs for each transmission channel are dependent on the MIMO channel response, the receiver spatial processing technique used by the receiver, and the transmit power allocated to the transmission channel. The total transmit power $P_{total}$ is typically fixed for the transmitter. The amount of transmit power $P_m$ allocated to each transmission channel m may be dependent on the number of data streams to transmit, e.g., $P_m=P_{total}/M$. The received SNRs for each transmission channel may be used to derive the SNR estimate for that transmission channel, as described above for equations (3) through (6).

The data transmission and rate selection techniques described herein may be implemented by various means. For example, these techniques may be implemented in hardware, software, or a combination thereof. For a hardware implementation, the processing units used to process data for transmission (e.g., TX data processor 120 in FIGS. 1 and 5) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used for rate selection (e.g., rate selector/controller 182 in FIG. 1) may also be implemented within one or more ASICs, DSPs, processors, and so on.

For a software implementation, the techniques described herein may be implemented with modules (e.g., procedures, functions, and so on) that perform the functions described herein. The software codes may be stored in a memory unit (e.g., memory unit 142 or 192 in FIG. 1) and executed by a processor (e.g., main controller 140 or 190). The memory unit may be implemented within the processor or external to the processor, in which case it can be communicatively coupled to the processor via various means as is known in the art.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus comprising:
   a controller operative to obtain a selection of a single code rate and a plurality of modulation schemes for a plurality of data streams to be sent to a single receiver, wherein a modulation scheme for each of the plurality of data streams is selected from among a set of modulation schemes associated with the single code rate; and
   a processor operative to encode the plurality of data streams in accordance with the single code rate and to modulate the plurality of data streams in accordance with the plurality of modulation schemes said processor further operative to jointly encode the plurality of data streams in accordance with the single code rate and to independently modulate the plurality of data streams in accordance with the plurality of modulation schemes.

2. The apparatus of claim 1, wherein the plurality of data streams is constrained to one code rate selected from among a plurality of code rates, wherein each of the plurality of code rates is associated with a respective set of modulation schemes, wherein the single code rate is the one code rate selected from among the plurality of code rates.

3. The apparatus of claim 1, wherein the single code rate and the plurality of modulation schemes are for a rate combination selected from among a plurality of rate combinations.

4. The apparatus of claim 1, wherein the controller is operative to receive the selection of the single code rate and the plurality of modulation schemes from the single receiver.

5. The apparatus of claim 1, wherein the controller is operative to determine signal-to-noise-and-interference ratio (SNR) estimates for the plurality of data streams and to select the single code rate and the plurality of modulation schemes based on the SNR estimates.

6. The apparatus of claim 1, wherein the processor is operative to encode and modulate each of the plurality of data streams independently.

7. The apparatus of claim 1, further comprising:
a second processor operative to spatially process the plurality of data streams for transmission via a plurality of spatial channels in a multiple-input multiple-output (MIMO) channel.

8. A method of transmitting data in a communication system, comprising:
obtaining a selection of a single code rate and a plurality of modulation schemes for a plurality of data streams to be sent to a single receiver, wherein a modulation scheme for each of the plurality of data streams is selected from among a set of modulation schemes associated with the single code rate;
encoding the plurality of data streams in accordance with the single code rate, wherein said encoding comprises jointly encoding the plurality of data streams in accordance with the single code rate; and
modulating the plurality of data streams in accordance with the plurality of modulation schemes, wherein said modulating comprises independently modulating the plurality of data streams in accordance with the plurality of modulation schemes.

9. The method of claim 8, further comprising:
spatially processing the plurality of data streams for transmission via a plurality of spatial channels in a multiple-input multiple-output (MIMO) channel.

10. An apparatus comprising:
means for obtaining a selection of a single code rate and a plurality of modulation schemes for a plurality of data streams to be sent to a single receiver, wherein a modulation scheme for each of the plurality of data streams is selected from among a set of modulation schemes associated with the single code rate;
means for encoding the plurality of data streams in accordance with the single code rate, wherein said means for encoding is configured to jointly encode the plurality of data streams in accordance with the single code rate; and
means for modulating the plurality of data streams in accordance with the plurality of modulation schemes, wherein said means for modulating is configured to independently modulate the plurality of data streams in accordance with the plurality of modulation schemes.

11. The apparatus of claim 10, further comprising:
means for spatially processing the plurality of data streams for transmission via a plurality of spatial channels in a multiple-input multiple-output (MIMO) channel.

12. An apparatus comprising:
a processor operative to determine channel estimates for a plurality of data streams to be sent to a single receiver; and
a controller operative to select a single code rate and a plurality of modulation schemes for the plurality of data streams based on the channel estimates, said controller further operative to jointly encode the plurality of data streams in accordance with the single code rate and to independently modulate the plurality of data streams in accordance with the plurality of modulation schemes, wherein a modulation scheme for each of the plurality of data streams is selected from among a set of modulation schemes associated with the single code rate.

13. The apparatus of claim 12, wherein the controller is operative to select one code rate from among a plurality of code rates and to provide the one code rate as the single code rate for the plurality of data streams.

14. The apparatus of claim 13, wherein each of the plurality of code rates is associated with a respective set of modulation schemes.

15. The apparatus of claim 12, wherein the controller is operative to select a modulation scheme for each of the plurality of data streams to achieve a non-negative SNR margin for the data stream.

16. An apparatus comprising:
a processor operative to determine channel estimates for a plurality of data streams to be sent to a single reciever; and
a controller operative to select a single code rate and a plurality of modulation schemes for the plurality of data streams based on the channel estimates, wherein the channel estimates comprises a signal-to-noise-and-interference ratio (SNR) estimates and wherein the controller is operative to select the plurality of modulation schemes for the plurality of data streams such that at least one data stream has negative SNR margin and the plurality of data streams has a non-negative total SNR margin.

17. The apparatus of claim 16, wherein the controller is operative to limit the negative SNR margin for each of the at least one data stream to be within a predetermined value.

18. The apparatus of claim 17, wherein the predetermined value is determined by the single code rate selected for the plurality of data streams.

19. The apparatus of claim 17, wherein the predetermined value is determined by the single code rate selected for the plurality of data streams, an index of each of the plurality of data streams, modulation selected for each data stream, the number of data streams being transmitted, or a combination thereof.

20. An apparatus comprising:
a processor operative to determine channel estimates for a plurality of data streams to be sent to a single receiver, and
a controller operative to select a single code rate and a plurality of modulation schemes for the plurality of data streams based on the channel estimates, wherein the channel estimates comprises a signal-to-noise-and-interference ratio (SNR) estimates and wherein the controller is operative to determine an overall throughput and a total SNR margin for each of a plurality of code rates, to select a code rate having a highest overall throughput and a non-negative total SNR margin among the plurality of code rates, and to provide the selected code rate as the single code rate for the plurality of data streams.

21. The apparatus of claim 20, wherein the controller is operative to select a lowest code rate among multiple code rates having the highest overall throughput.

22. An apparatus comprising:
a processor operative to determine channel estimates for a plurality of data streams to be sent to a single receiver; and
a controller operative to select a single code rate and a plurality of modulation schemes for the plurality of data streams based on the channel estimates, wherein the channel estimates comprises a signal-to-noise-and-interference ratio (SNR) estimates and wherein the processor is operative to determine received SNRs for a plurality of frequency subbands for each of the plurality of data streams and to determine an SNR estimate for each data stream based on the received SNRs for the data stream.

23. A method of performing rate selection in a communication system, comprising:
determining channel estimates for a plurality of data streams to be sent to a single receiver;

selecting a single code rate and a plurality of modulation schemes for the plurality of data streams based on the channel estimates, wherein a modulation scheme for each of the plurality of data streams is selected from among a set of modulation schemes associated with the single code rate;

encoding the plurality of data streams in accordance with the single code rate, wherein said encoding comprises jointly encoding the plurality of data streams in accordance with the single code rate; and modulating the plurality of data streams in accordance with the plurality of modulation schemes, wherein said modulating comprises independently modulating the plurality of data streams in accordance with the plurality of modulation schemes.

24. The method of claim 23, wherein the channel estimates comprise signal-to-noise-and-interference ratio (SNR) estimates and wherein the selecting the single code rate and the plurality of modulation schemes comprises:

selecting a modulation scheme for each of the plurality of data streams to achieve a non-negative SNR margin for the data stream.

25. A method of performing rate selection in a communication system, comprising:

determining channel estimates for a plurality of data streams to be sent to a single receiver; selecting a single code rate and a plurality of modulation schemes for the plurality of data streams based on the channel estimates;

encoding the plurality of data streams in accordance with the single code rate; and modulating the plurality of data streams in accordance with the plurality of modulation schemes, wherein the channel estimates comprise signal-to-noise-and-interference ratio (SNR) estimates and wherein the selecting the single code rate and the plurality of modulation schemes comprises:

selecting the plurality of modulation schemes for the plurality of data streams such that at least one data stream has negative SNR margin and the plurality of data streams have a non-negative total SNR margin.

26. A method of performing rate selection in a communication system, comprising:

determining channel estimates for a plurality of data streams to be sent to a single receiver; selecting a single code rate and a plurality of modulation schemes for the plurality of data streams based on the channel estimates;

encoding the plurality of data streams in accordance with the single code rate; and modulating the plurality of data streams in accordance with the plurality of modulation schemes, wherein the channel estimates comprise signal-to-noise-and-interference ratio (SNR) estimates and wherein the selecting the single code rate and the plurality of modulation schemes comprises:

determining an overall throughput and a total SNR margin for each of a plurality of code rates, and selecting a code rate having a highest overall throughput and a non-negative total SNR margin among the plurality of code rates, wherein the single code rate is the selected code rate.

27. An apparatus comprising:

means for determining channel estimates for a plurality of data streams to be sent to a single receiver; and means for selecting a single code rate and a plurality of modulation schemes for the plurality of data streams based on the channel estimates, said means for selecting a single code rate operative to jointly encode the plurality of data streams in accordance with the single code rate and to independently modulate the plurality of data streams in accordance with the plurality of modulation schemes, wherein a modulation scheme for each of the plurality of data streams is selected from among a set of modulation schemes associated with the single code rate.

28. The apparatus of claim 27, wherein the channel estimates comprise signal-to-noise-and-interference ratio (SNR) estimates and wherein the means for selecting the single code rate and the plurality of modulation schemes comprises:

means for selecting a modulation scheme for each of the plurality of data streams to achieve a non-negative SNR margin for the data stream.

29. An apparatus comprising:

means for determining channel estimates for a plurality of data streams to be sent to a single receiver; and means for selecting a single code rate and a plurality of modulation schemes for the plurality of data streams based on the channel estimates, wherein the channel estimates comprise signal-to-noise-and-interference ratio (SNR) estimates and wherein the means for selecting the single code rate and the plurality of modulation schemes comprises:

means for selecting the plurality of modulation schemes for the plurality of data streams such that at least one data stream has negative SNR margin and the plurality of data streams have a non-negative total SNR margin.

30. An apparatus comprising:

means for selecting a single code rate and a plurality of modulation schemes for the plurality of data streams based on the channel estimates, wherein the channel estimates comprise signal-to-noise-and-interference ratio (SNR) estimates and wherein the means for selecting the single code rate and the plurality of modulation schemes comprises:

means for determining an overall throughput and a total SNR margin for each of a plurality of code rates, and means for selecting a code rate having a highest overall throughput and a non-negative total SNR margin among the plurality of code rates, wherein the single code rate is the selected code rate.

31. A processor readable non-transitory media encoded with a computer program, the computer program comprising instructions for:

determining channel estimates for a plurality of data streams to be sent to a single receiver;

selecting a single code rate and a plurality of modulation schemes for the plurality of data streams based on the channel estimates, wherein a modulation scheme for each of the plurality of data streams is selected from among a set of modulation schemes associated with the single code rate;

encoding, jointly, the plurality of data streams in accordance with the single code rate; and modulating, independently, the plurality of data streams in accordance with the plurality of modulation schemes.

32. An apparatus comprising:

a processor operative to determine channel estimates for a plurality of data streams to be sent to a single receiver, wherein the channel estimates comprises a signal-to-noise-and-interference ratio (SNR) estimates; and a controller operative to select a single code rate and a plurality of modulation schemes for the plurality of data streams based on the channel estimates, wherein the controller is operative to determine an overall throughput and a total SNR margin for each of a plurality of code rates for each of a plurality of stream combinations, to select a code rate and a stream combination having a highest overall throughput and a non-negative total SNR margin among the plurality of code rates and the plurality of stream combinations, and to provide the selected code rate as the single code rate, wherein each stream combination corresponds to a different number of data streams, and wherein the plurality of data streams are for the selected stream combination.

33. The apparatus of claim 32, wherein the controller is operative to select a stream combination with fewest data streams among multiple stream combinations having the highest overall throughput.

34. An apparatus comprising:
a processor operative to determine channel estimates for a plurality of data streams to be sent to a single receiver wherein the channel estimates comprises a signal-to-noise-and-interference ratio (SNR) estimates; and
a controller operative to select a single code rate and a plurality of modulation schemes for the plurality of data streams based on the channel estimates, wherein the controller is operative to determine a total SNR margin for each of a plurality of rate combinations, to select a rate combination having a highest overall throughput and a non-negative total SNR margin among the plurality of rate combinations, and to obtain the single code rate and the plurality of modulation schemes from the selected rate combination, wherein each rate combination is associated with a specific number of data streams, a specific code rate for all of the data streams, a specific modulation scheme for each of the data streams, and a specific overall throughput for all of the data streams.

35. The apparatus of claim 34, wherein the controller is operative to select a rate combination with fewest data streams among multiple rate combinations having the highest overall throughput.

36. The apparatus of claim 34, wherein the controller is operative to select a rate combination with a largest total SNR margin among multiple rate combinations having the highest overall throughput.

37. The apparatus of claim 34, further comprising:
a memory configured to store a look-up table of the plurality of rate combinations arranged in an order determined by a required SNR for one data stream in each of the plurality of rate combinations, and wherein the controller is operative to select the rate combination based on the look-up table.

38. A method of performing rate selection in a communication system, comprising:
determining channel estimates for a plurality of data streams to be sent to a single receiver, wherein the channel estimates comprise signal-to-noise-and-interference ratio (SNR) estimates; and
selecting a single code rate and a plurality of modulation schemes for the plurality of data streams based on the channel estimates by:
determining an overall throughput and a total SNR margin for each of a plurality of code rates for each of a plurality of stream combinations, wherein each stream combination corresponds to a different number of data streams,
selecting a code rate and a stream combination having a highest overall throughput and a non-negative total SNR margin among the plurality of code rates and the plurality of stream combinations, wherein the single code rate is the selected code rate and the plurality of data streams are for the selected stream combination;
encoding data streams of the selected stream combination in accordance with the selected code rate; and
modulating the data streams of the selected stream combination in accordance with the selected plurality of modulation schemes.

39. A method of performing rate selection in a communication system, comprising:
determining channel estimates for a plurality of data streams to be sent to a single receiver, wherein the channel estimates comprise signal-to-noise-and-interference ratio (SNR) estimates; and
selecting a single code rate and a plurality of modulation schemes for the plurality of data streams based on the channel estimates by:
determining a total SNR margin for each of a plurality of rate combinations, wherein each rate combination is associated with a specific number of data streams to transmit, a specific code rate for all of the data streams, a specific modulation scheme for each of the data streams, and a specific overall throughput for all of the data streams, and
selecting a rate combination having a highest overall throughput and a non-negative total SNR margin among the plurality of rate combinations, wherein the single code rate and the plurality of modulation schemes are for the selected rate combination.

40. An apparatus comprising:
means for determining channel estimates for a plurality of data streams to be sent to a single receiver, wherein the channel estimates comprise signal-to-noise-and-interference ratio (SNR) estimates; and
means for selecting a single code rate and a plurality of modulation schemes for the plurality of data streams based on the channel estimates comprising
means for determining an overall throughput and a total SNR margin for each of a plurality of code rates for each of a plurality of stream combinations, wherein each stream combination corresponds to a different number of data streams, and
means for selecting a code rate and a stream combination having a highest overall throughput and a non-negative total SNR margin among the plurality of code rates and the plurality of stream combinations, wherein the single code rate is the selected code rate and the plurality of data streams are for the selected stream combination.

41. An apparatus comprising:
means for determining channel estimates for a plurality of data streams to be sent to a single receiver, wherein the channel estimates comprise signal-to-noise-and-interference ratio (SNR) estimates; and
means for selecting a single code rate and a plurality of modulation schemes for the plurality of data streams based on the channel estimates, comprising
means for determining a total SNR margin for each of a plurality of rate combinations, wherein each rate combination is associated with a specific number of data streams, a specific code rate for all of the data streams, a specific modulation scheme for each of the data streams, and a specific overall throughput for all of the data streams, and
means for selecting a rate combination having a highest overall throughput and a non-negative total SNR margin among the plurality of rate combinations, wherein the single code rate and the plurality of modulation schemes are for the selected rate combination.

42. A computer-program product for performing rate selection in a communication system comprising a computer readable non-transitory medium having instructions stored thereon, the instructions being executable by one or more processors and the computer program comprising instructions for:

instructions for determining channel estimates for a plurality of data streams to be sent to a single receiver, wherein the channel estimates comprise signal-to-noise-and-interference ratio (SNR) estimates; and instructions for selecting a single code rate and a plurality of modulation schemes for the plurality of data streams based on the channel estimates by:

determining an overall throughput and a total SNR margin for each of a plurality of code rates for each of a plurality of stream combinations, wherein each stream combination corresponds to a different number of data streams, and selecting a code rate and a stream combination having a highest overall throughput and a non-negative total SNR margin among the plurality of code rates and the plurality of stream combinations, wherein the single code rate is the selected code rate and the plurality of data streams are for the selected stream combination.

43. A computer-program product for performing rate selection in a communication system comprising a computer readable non-transitory medium having instructions stored thereon, the instructions being executable by one or more processors and the computer program comprising instructions for:

determining channel estimates for a plurality of data streams to be sent to a single receiver, wherein the channel estimates comprise signal-to-noise-and-interference ratio (SNR) estimates; and selecting a single code rate and a plurality of modulation schemes for the plurality of data streams based on the channel estimates by:

determining a total SNR margin for each of a plurality of rate combinations, wherein each rate combination is associated with a specific number of data streams to transmit, a specific code rate for all of the data streams, a specific modulation scheme for each of the data streams, and a specific overall throughput for all of the data streams, and selecting a rate combination having a highest overall throughput and a non-negative total SNR margin among the plurality of rate combinations, wherein the single code rate and the plurality of modulation schemes are for the selected rate combination.

\* \* \* \* \*